(12) United States Patent
Yuan et al.

(10) Patent No.: US 9,896,826 B2
(45) Date of Patent: Feb. 20, 2018

(54) TOUCH-CONTROL FAUCET

(71) Applicant: Globe Union Industrial Corp., Taichung (TW)

(72) Inventors: Chuahua Yuan, Taichung (TW); Yiping Lin, Taichung (TW); Chunhung Li, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 121 days.

(21) Appl. No.: 14/823,137

(22) Filed: Aug. 11, 2015

(65) Prior Publication Data
US 2016/0222635 A1    Aug. 4, 2016

(30) Foreign Application Priority Data

Feb. 2, 2015   (CN) .................... 2015 2 0072516 U

(51) Int. Cl.
| | | |
|---|---|---|
| *E03C 1/04* | (2006.01) | |
| *F16K 31/60* | (2006.01) | |
| *F16K 31/46* | (2006.01) | |
| *E03C 1/05* | (2006.01) | |

(52) U.S. Cl.
CPC .......... *E03C 1/057* (2013.01); *E03C 1/0404* (2013.01); *F16K 31/46* (2013.01); *F16K 31/60* (2013.01)

(58) Field of Classification Search
CPC ........ E03C 1/057; E03C 1/0404; F16K 31/60; F16K 31/46
USPC .............. 251/319–323, 339; 4/678
See application file for complete search history.

(56) References Cited

U.S. PATENT DOCUMENTS

| | | | | |
|---|---|---|---|---|
| 3,212,751 A | * | 10/1965 | Hassa ................... | F16K 31/086 251/129.03 |
| 4,624,443 A | * | 11/1986 | Eidsmore ................ | F16K 17/24 137/460 |
| 4,694,860 A | * | 9/1987 | Eidsmore ................ | F16K 17/24 137/614.21 |
| 4,792,113 A | * | 12/1988 | Eidsmore ................ | F16K 17/24 137/460 |

(Continued)

FOREIGN PATENT DOCUMENTS

| | | |
|---|---|---|
| TW | I228578 B | 3/2005 |
| TW | M342670 U | 10/2008 |

(Continued)

*Primary Examiner* — Marina Tietjen
(74) *Attorney, Agent, or Firm* — Alan D. Kamrath; Kamrath IP Lawfirm, P.A.

(57) ABSTRACT

The faucet includes a main body, a positioning sleeve, a water-saving valve and an activator. The main body has an inlet end, an outlet end, a water channel and an outlet opening communicating with the water channel. The outlet opening is located on a wall of the outlet end. The positioning sleeve is fixed in the inlet end and has a water hole and a passing hole. The water hole communicates with the water channel and the outlet opening. The water-saving valve is disposed between the outlet end and the positioning sleeve and has an operating bar for controlling the water-saving valve to allow water in the water channel to flow toward the water hole. The activator has a pressing cap disposed on the outlet end. The pressing cap is slidable on the positioning sleeve and moves the operating bar when the pressing cap is pressed.

17 Claims, 26 Drawing Sheets

(56) References Cited

U.S. PATENT DOCUMENTS

| | | | | |
|---|---|---|---|---|
| 4,793,379 A | * | 12/1988 | Eidsmore | F16K 1/306 137/460 |
| 8,555,922 B2 | * | 10/2013 | Migliore | F16K 11/0856 137/607 |
| 2011/0011473 A1 | * | 1/2011 | Lang | E03C 1/055 137/625.41 |

FOREIGN PATENT DOCUMENTS

| | | |
|---|---|---|
| TW | M382408 U | 6/2010 |
| TW | I369459 | 8/2012 |
| TW | M452280 U | 5/2013 |

\* cited by examiner

TOUCH-CONTROL FAUCET

BACKGROUND OF THE INVENTION

1. Technical Field

The invention relates to faucets, particularly to touch-control faucets operated by touch.

2. Related Art

Because conventional infrared sensitive faucets possess drawbacks of high cost, complicated structure and high failure rate, touch-control water-saving valves, water savers and water-saving switches have been developed. For example, non-self-closed water-saving valves are disclosed by Taiwan patent Nos. M342670 and I228578 and self-closed water-saving valves are disclosed by Taiwan patent Nos. I369459, M452280 and M382408. A common feature of these water-saving valves is to be mounted on an outlet of faucet. Also, they have a rod-shaped activator for being operated by a user. When the faucet with the water-saving valve keeps opening, the water flow can be easily switched on or off by slightly pressing the activator. And a function of water saving can be accomplished by the inner structure of the water-saving valves.

The self-closed water-saving valves can automatically stop water after water flows out for a short period of time, but the non-self-closed water-saving valves will not stop water until the activator is pressed again. This is the difference between the two kinds of valves.

There are many commercial products which are similar to the abovementioned patents in the market. For example, serial products of the 3M® one touch water-saving valve for being mounted on an outlet of faucet, also can open or close water by pressing.

Also this kind of water-saving valve possesses advantages of easy installation, water saving and simple structure, it is just the most serious drawback that users must directly touch the water-saving valve because dirt on the finger will contaminate the activator when a user touches the activator. According to the abovementioned patent specifications and products, the water flowing through the water-saving valve must flow through the activator, this will make the dirt on the activator will be carried by the water flow. Thus the water is contaminated. As a result, these water-saving valves cannot meet requirements of water health of some countries and are prohibited to use in specific water-using situations.

Conventional faucets utilizes a core shaft driven by a handle to control water flow or adjust water temperature, but such control by a core shaft is not fast and convenient enough because it needs a larger operation. Additionally, the larger operation also needs a larger space. These faucets cannot be installed if they near a wall too much or the space is limited. Also, anything cannot be put within an operating range of the faucet, this will further limit usable space. Furthermore, the control structure of the handle and core shaft will influence gorgeousness and quality of appearance of the faucet. It is adverse to increase of additional value of the product.

SUMMARY OF THE INVENTION

An object of the invention is to provide a touch-control faucet, which can prevent the water from being contaminated by users' fingers.

Another object of the invention is to provide a touch-control faucet, which can replace the conventional core shaft.

Still another object of the invention is to provide a touch-control faucet, which can change different directions and type of water flow.

To accomplish the above objects, the faucet of the invention includes a main body, a positioning sleeve, a water-saving valve and an activator. The main body has an inlet end, an outlet end, a water channel and an outlet opening communicating with the water channel. The outlet opening is located on a wall of the outlet end. The positioning sleeve is fixed in the inlet end and has a water hole and a passing hole. The water hole communicates with the water channel and the outlet opening. The water-saving valve is disposed between the outlet end and the positioning sleeve and has an operating bar for controlling the water-saving valve to allow water in the water channel to flow toward the water hole. The activator has a pressing cap disposed on the outlet end. The pressing cap is slidable on the positioning sleeve and moves the operating bar when the pressing cap is pressed.

DETAILED DESCRIPTION OF THE INVENTION

Figure 1:
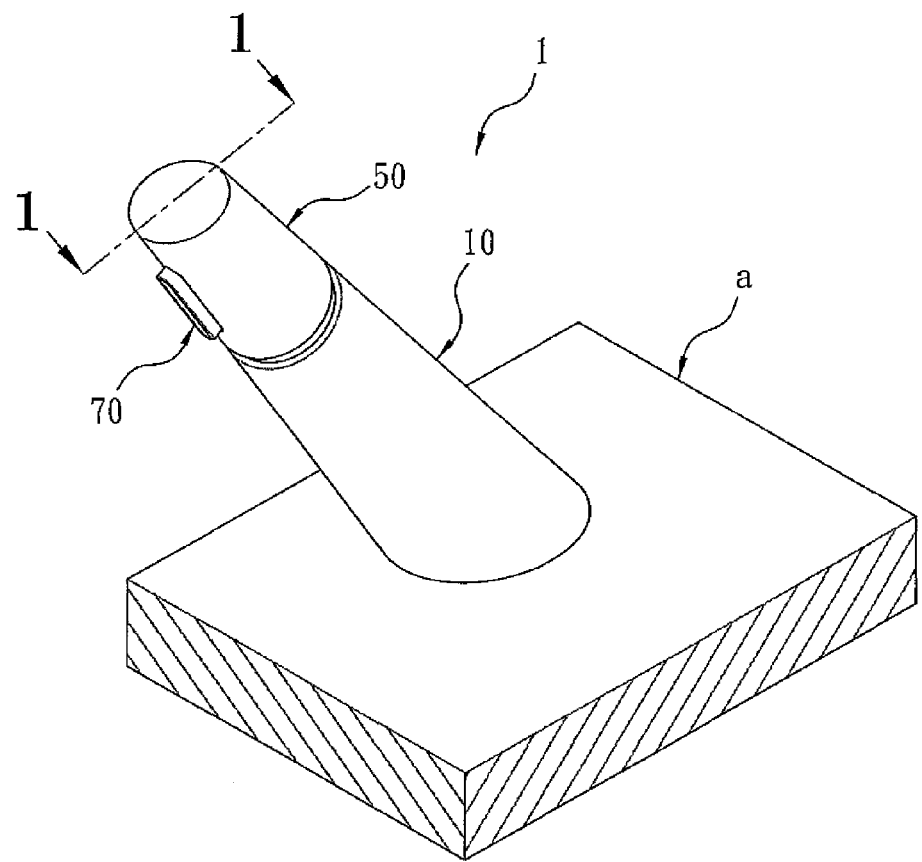
FIG. 1 is a schematic view of the first embodiment of the invention installed on a wall.
Figure 2:
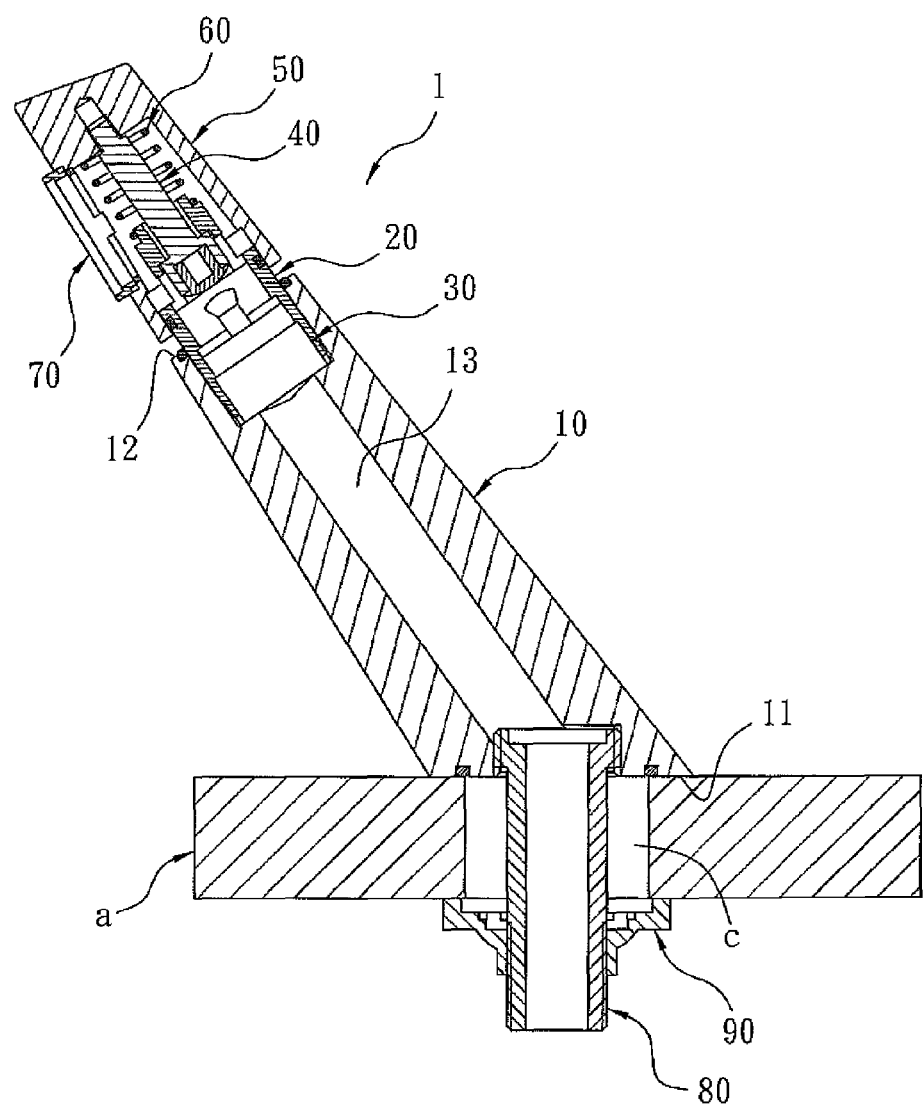
FIG. 2 is a cross-sectional view along line 1-1 in FIG. 1.
Figure 3:
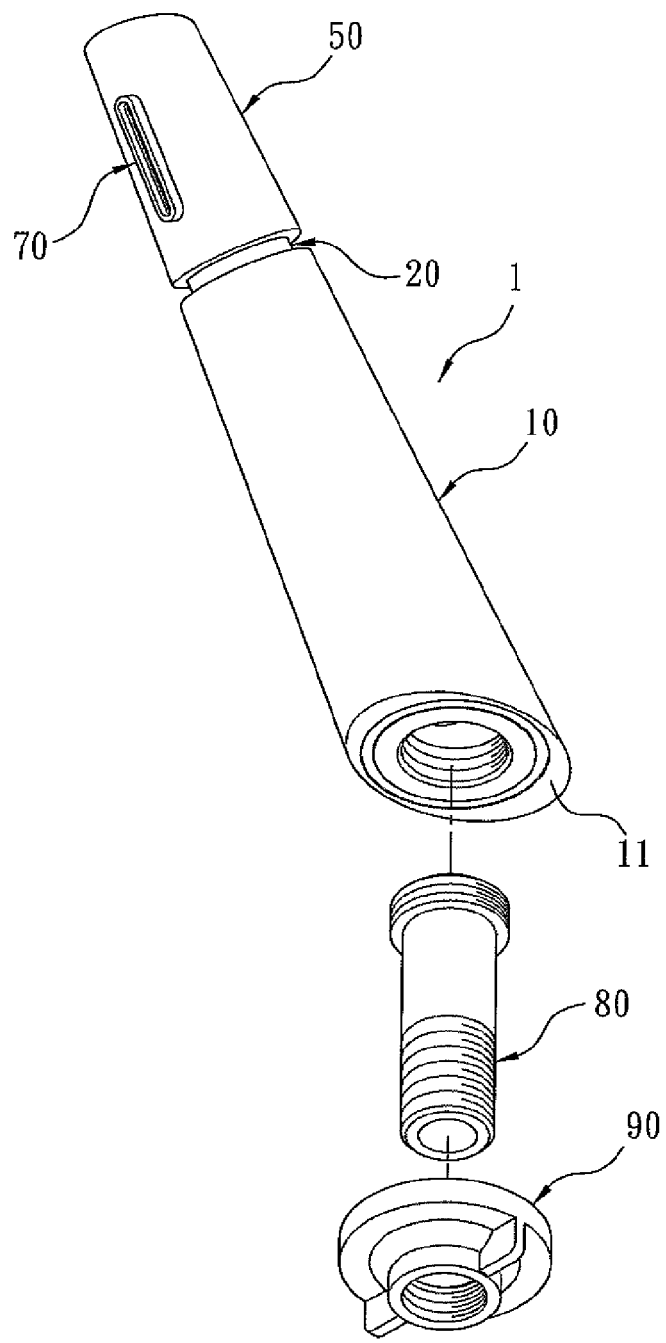
FIG. 3 is a briefly exploded view of the first embodiment of the invention.

As shown in FIGS. 1-3, the invention provides the first embodiment of the touch-control faucet of the invention. The touch-control faucet 1 is installed on a wall a and includes a main body 10, a positioning sleeve 20, a water-saving valve 30, an activating rod 40 and a pressing cap 50.

Figure 4:
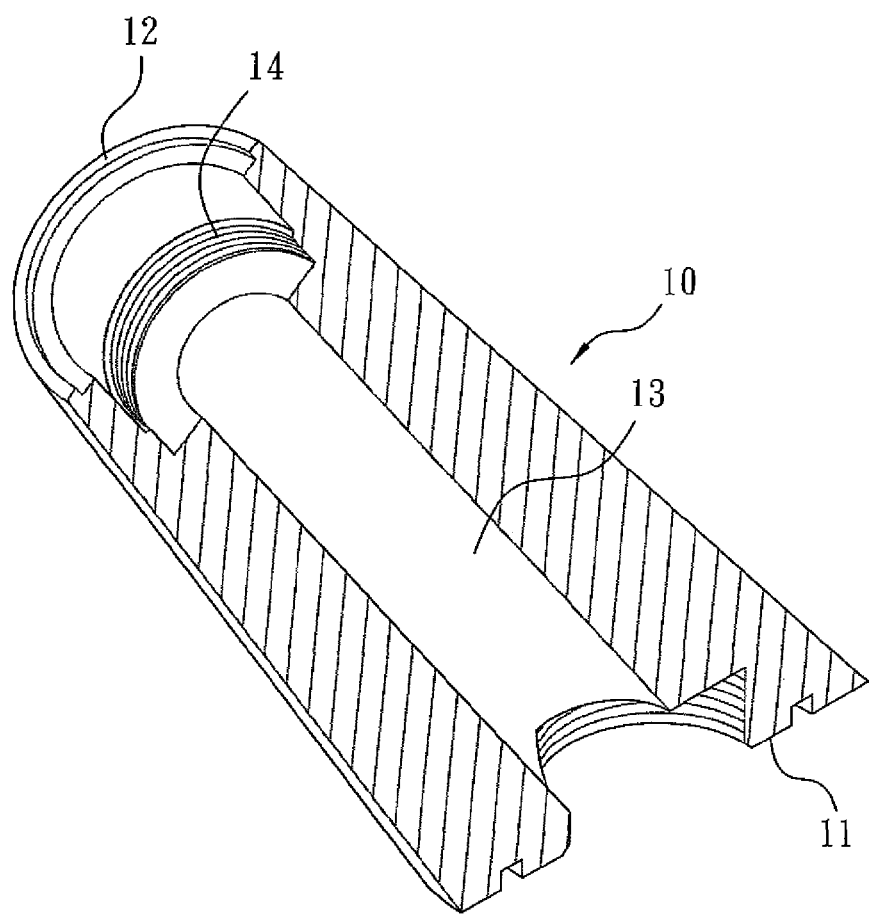
FIG. 4 is a cross-sectional view of the main body of the first embodiment of the invention.

As shown in FIG. 4, the main body 10 has an inlet end 11, an outlet end 12 and a water channel 13 between inlet end 11 and the outlet end 12.

As shown in FIGS. 5-8, the positioning sleeve 20 is fixed on the outlet end 12 of the main body 10 and is provided with at least one water hole 21 and a passing hole 22. In this embodiment, four water holes 21 are symmetrically arranged in a circular shape.

The water-saving valve 30 is disposed between the outlet end 12 and the positioning sleeve 20 and is provided with an operating bar 31 for controlling the water-saving valve 30 to allow water to flow through the water-saving valve 30.

The activating rod 40 has a pushing portion 41 restricted in the positioning sleeve 20 and a rod portion 42 connecting the pushing portion 41 and penetrating through the passing hole 22. The activating rod 40 can be linearly moved along an axis X of the positioning sleeve 20 to press the operating bar 31 of the water-saving valve 30.

Figure 5:
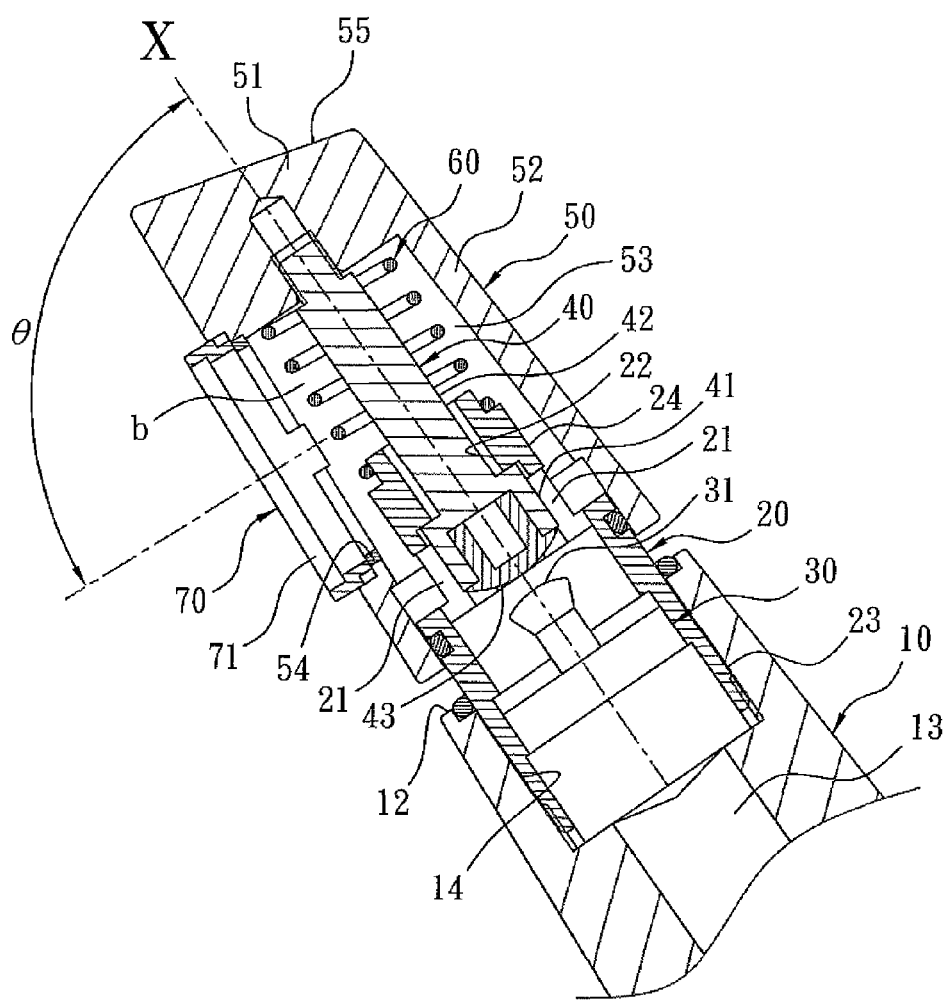
FIG. 5 is a partially enlarged view of FIG. 2.

The pressing cap 50 is provided with an end wall 51, a surrounding wall 52 extending from the end wall 51 and an inner space 53 defined by the end wall 51 and the surrounding wall 52. The end wall 51 connects with the rod portion 42 of the activating rod 40. The positioning sleeve 20 is slidably received in the surrounding wall 52. As shown in FIG. 5, the pressing cap 50 has a water chamber b defined by the inner space 53, the positioning sleeve 20 and the activating rod 40 for communicating with the water holes 21. The surrounding wall 52 is formed with a water opening 54 communicating with the water chamber b. Thereby, when a user presses the pressing cap 50, the water-saving valve 30 will be opened through the activating rod 40 and the water flowing through the water-saving valve 30 will flow through the water holes 21 and the water chamber b and flow out from the outlet opening 54. The end wall 51 of the pressing cap 50 may be formed with a pressing surface 55 for being pressed by a user.

The shown embodiment of the invention further includes a restorer 60 for restoring the pressing cap 50 after it has been pressed. The restorer 60 is an elastic element disposed between the positioning sleeve 20 and the pressing cap 50. Preferably, the elastic element is a compression spring which is penetrated through by the rod portion 42 of the activating rod 40. Two ends of the compression spring are separately stopped by the end wall 51 of the pressing cap 50 and the positioning sleeve 20. When the pressing cap 50 is being pressed, the compression spring is shrunk to generate elasticity.

The restorer 60 is not limited to the elastic element, there still are other available solutions. For example, two magnetic elements are separately disposed at two corresponding positions of the pressing cap 50 and the outlet end 12 of the main body 10 (not shown), thus the two magnetic elements will generate magnetic repulsion when the pressing cap 50 is pressed.

Figure 7:
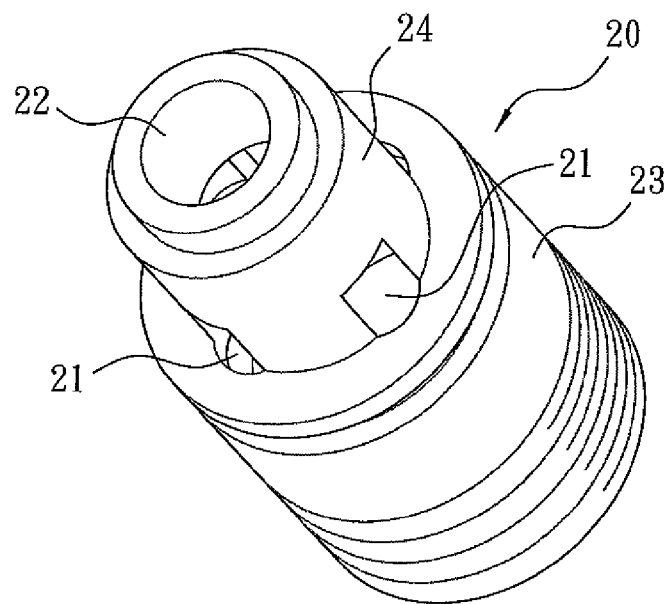
FIG. 7 is a perspective view of the positioning sleeve of the first embodiment of the invention.
Figure 8:
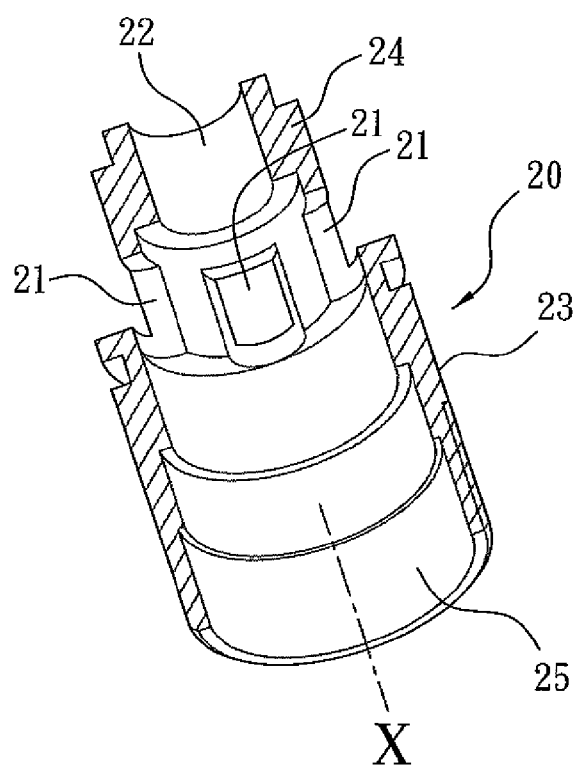
FIG. 8 is a cross-sectional view of the positioning sleeve of the first embodiment of the invention.

Please refer to FIGS. 4 and 5. In this embodiment, the water channel 13 is formed with a valve hole 14 in the outlet end 12. The positioning sleeve 20 has a first cylinder portion 23 with a larger diameter and a second cylinder portion 24 with a smaller diameter as shown in FIGS. 7-8. The first cylinder portion 23 of the positioning sleeve 20 is screwed with the valve hole 14. The water holes 21 are located between the first cylinder portion 23 and the second cylinder portion 24. The passing hole 22 is located at the center of the second cylinder portion 24, and the pushing portion 41 of the activating rod 40 is stopped by the second cylinder portion 24. The first cylinder portion 23 is further formed with an installation chamber 25 for receiving the water-saving valve 30, and the water-saving valve 30 abuts against the bottom of the valve hole 14.

Figure 6:
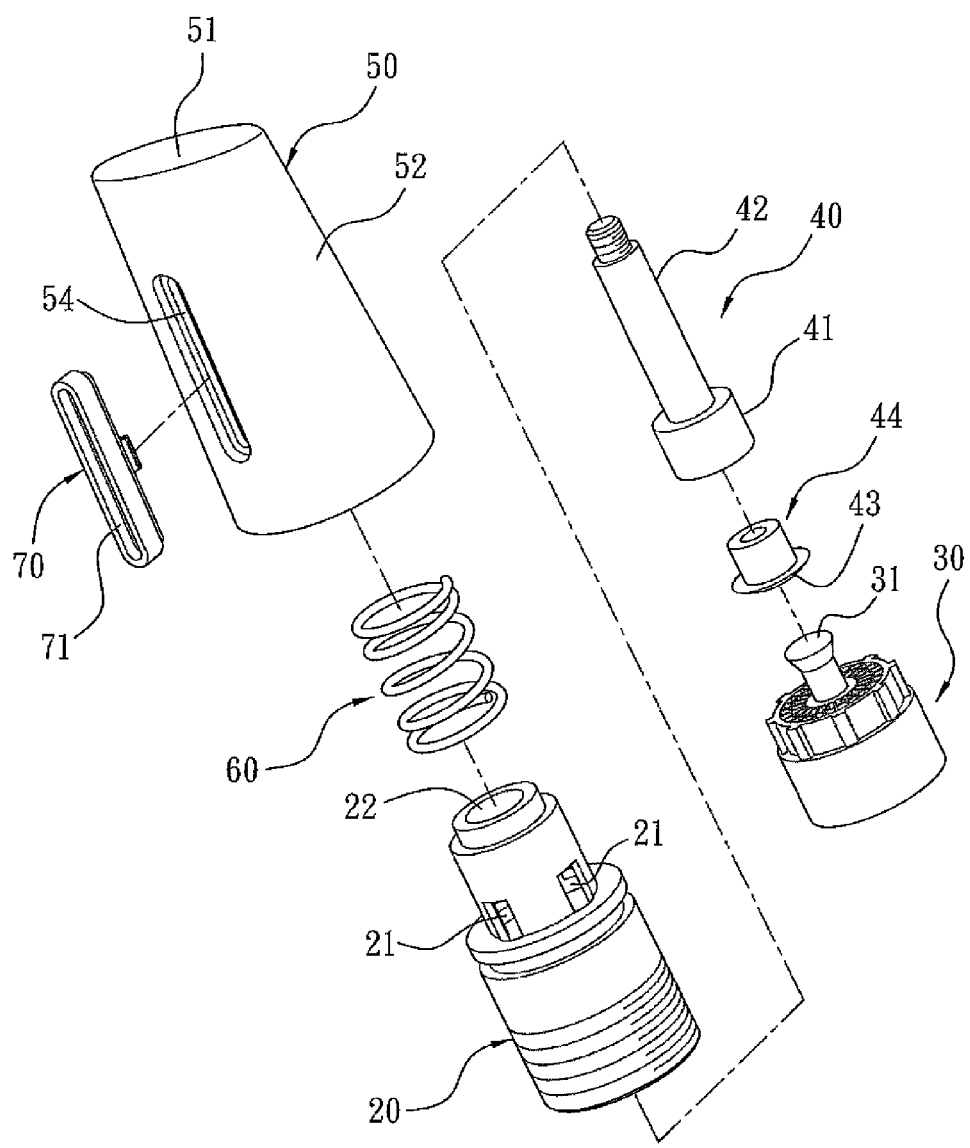
FIG. 6 is a partially exploded view of the first embodiment of the invention.

As shown in FIGS. 5-6, in this embodiment, the activating rod 40 can adopt a rigid plastic or metal material. Because using such a rigid material to touch the operating bar 31 is easy to damage the operating bar 31, the pushing portion 41 may be provided with a soft pad 43 for touching the operating bar 31. Preferably, the soft pad 43 can be formed by a plastic plug 44 plugged atop the pushing portion 41.

As shown in FIGS. 5-6, to keep smoothness of the water flow and control types of the water flow, a water guide 70 may be further provided over the water opening 54 for guiding water flow. The water guide 70 has a longitudinal water slot 71 along the axis X.

As shown in FIGS. 2-3, the embodiment may further include an inlet tube 80 and a nut 90 for fixing the faucet 1 onto the wall a. One end of the inlet tube 80 is screwed to the inlet end 11, the other end thereof penetrates an installing hole c and screws with the nut 90 to fix the main body 10 on the wall a.

In this embodiment, angle θ between an opening direction of the water opening 54 of the pressing cap 50 and the axis X is about 90 degrees. Thus the water flow in the main body 10 can be turned rightangularly. But angle θ is not limited to 90 degrees, any angle between 30 degrees and 120 degrees is available.

The water-saving valve 30 may adopt commercially available products. A common feature of these products is the function of water saving. Some of these products have a self-close function, but some of these products do not have a self-close function. When a water-saving valve 30 with a self-close function is used, it will automatically restore to stop water after the operating bar 31 is touched to open water flow. Contrarily, when a water-saving valve 30 without a self-close function is used, a user must re-press the pressing cap 50 to stop water after the operating bar 31 is touched to open water flow. However, all of these two kinds of water-saving valves can be applied in the embodiment. The water-saving valve 30 is a common component, it is applied in the embodiment as a water switch with a water-saving function.

The wall a for being mounted by the faucet 1 is a common level counter such as a kitchen counter, bathroom basin or any other possible counters or basins. Thus, the pressing cap 50 is located atop the faucet 1, a user can press down the pressing cap 50. Of course, the wall a may be vertical or at any angle. The faucet 1 can provide different pressing modes, water flow directions and flowing types if the faucet 1 is installed at different angles. It is noted that automatic restoration of the pressing cap 50 because of its own weight is possible when the pressing cap 50 must be pressed upward. Under this situation, the restorer 60 can be omitted.

Figure 9:
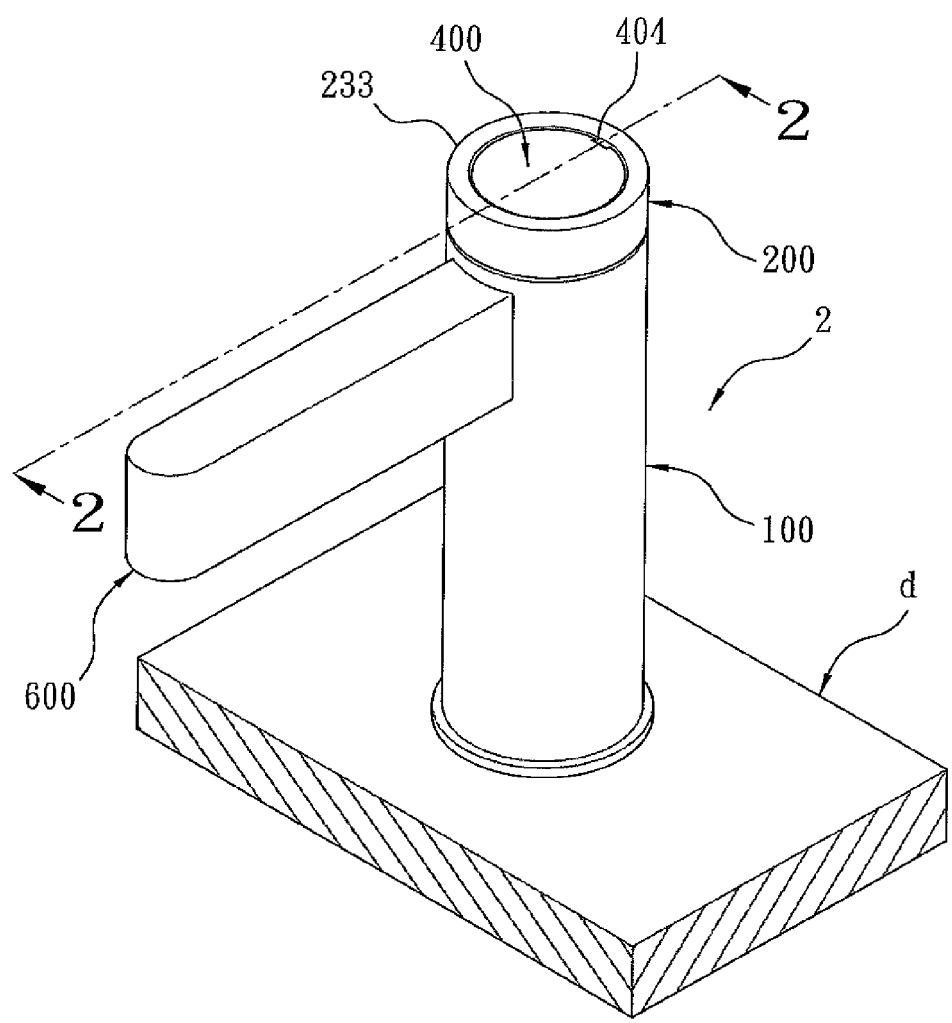
FIG. 9 is a schematic view of the second embodiment of the invention installed on a wall.
Figure 10:
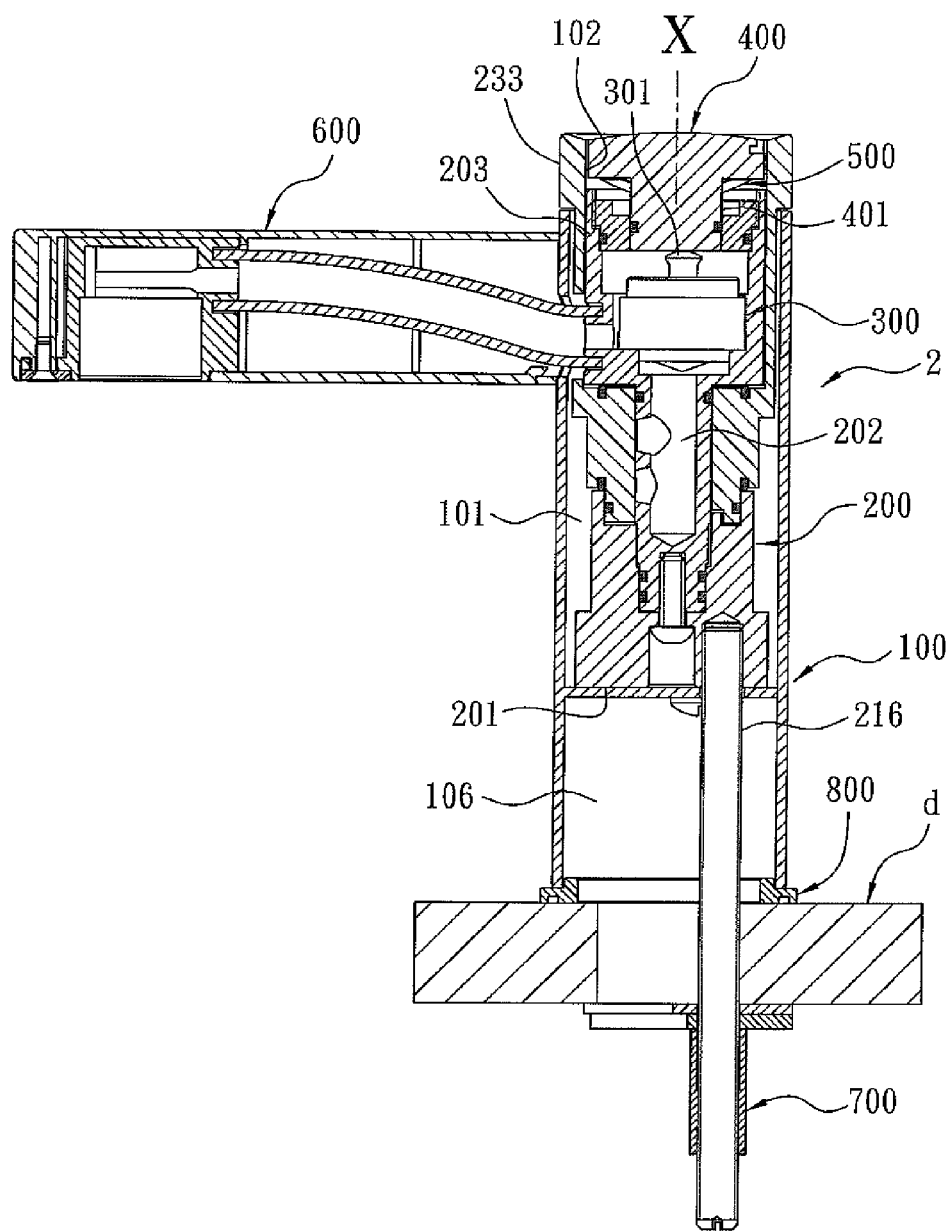
FIG. 10 is a cross-sectional view along line 2-2 in FIG. 9.
Figure 11:
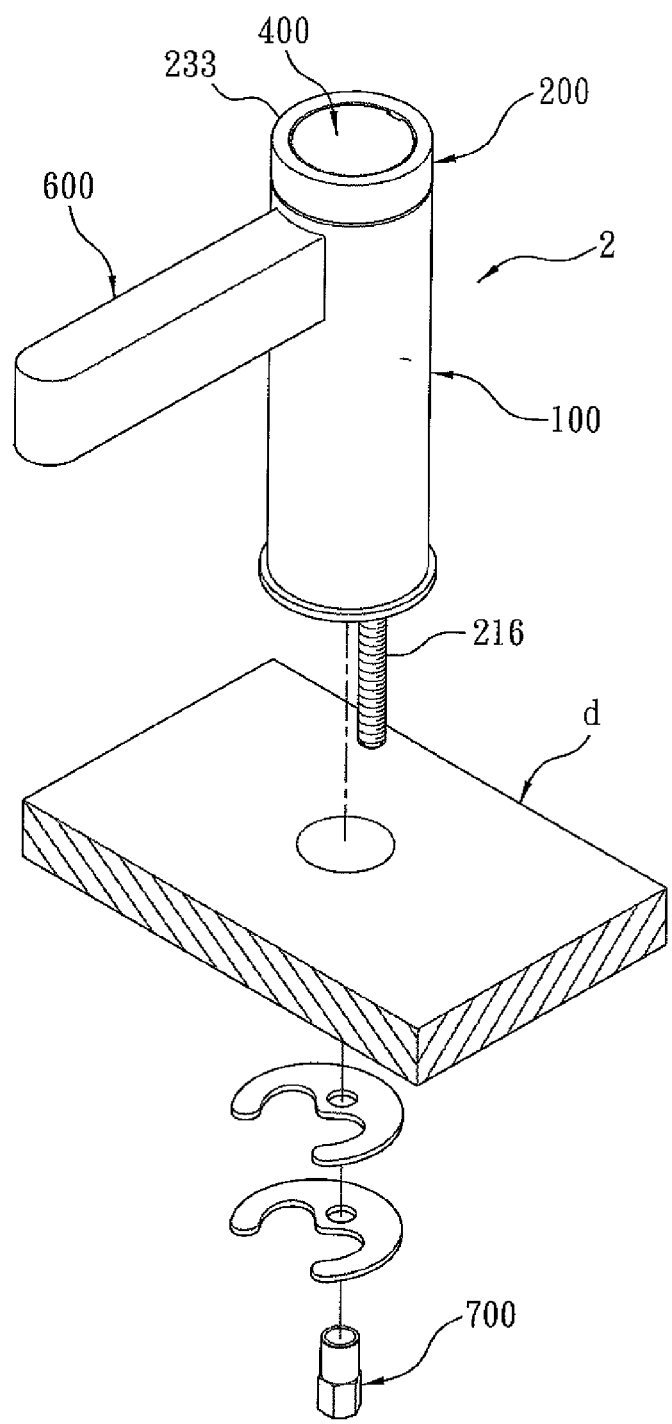
FIG. 11 is a briefly exploded view of the second embodiment of the invention and shows a separate wall.

As shown in FIGS. 9-11, the invention provides the second embodiment of the touch-control faucet of the invention. The touch-control faucet 2 is installed on a wall d and includes a shell body 100, a temperature-control valve 200, a water-saving valve 300 and a pressing button 400.

Figure 12:
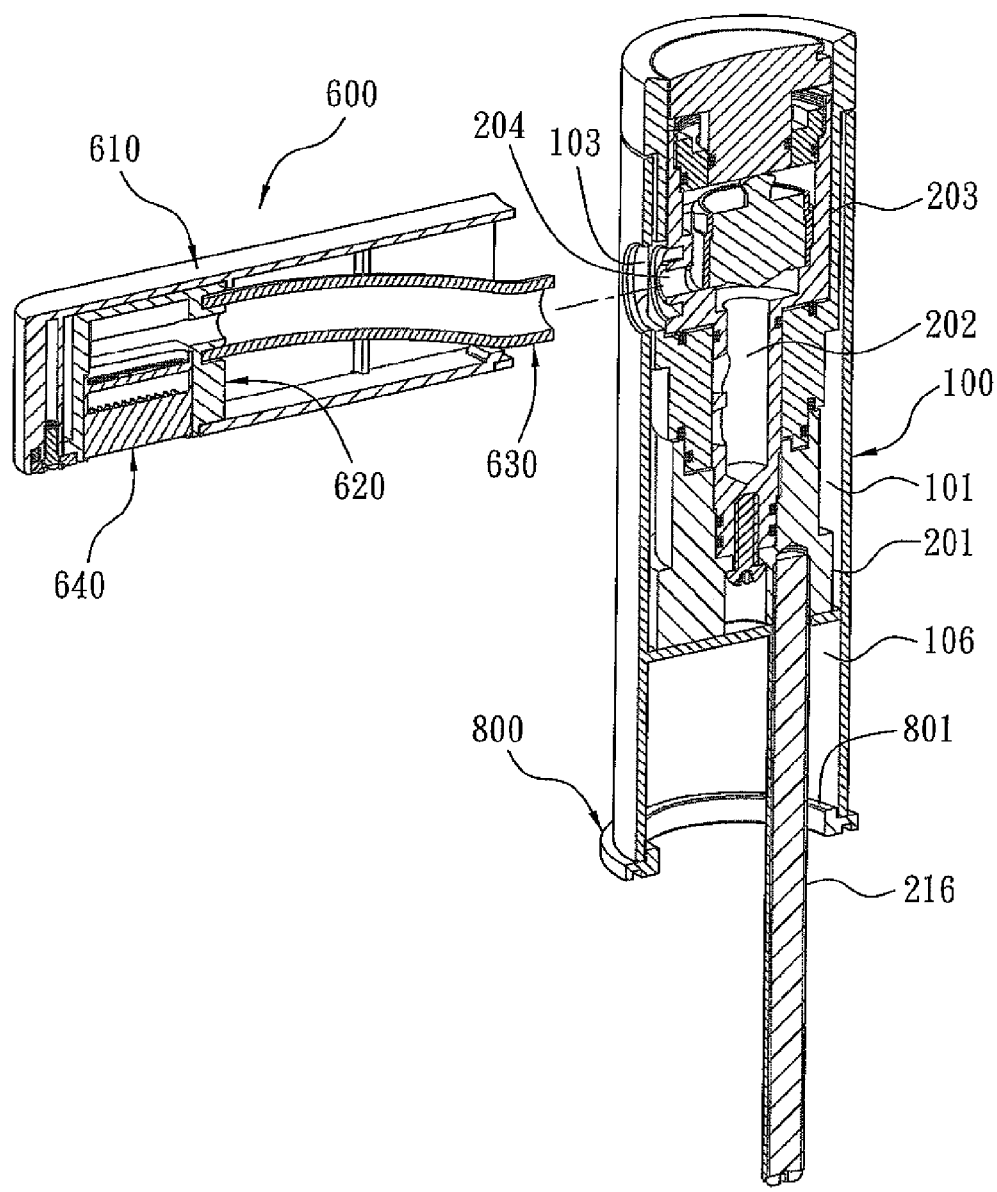
FIG. 12 is an exploded cross-sectional view of the outer outlet element separated from the shell body and temperature-control valve of the second embodiment of the invention.
Figure 13:
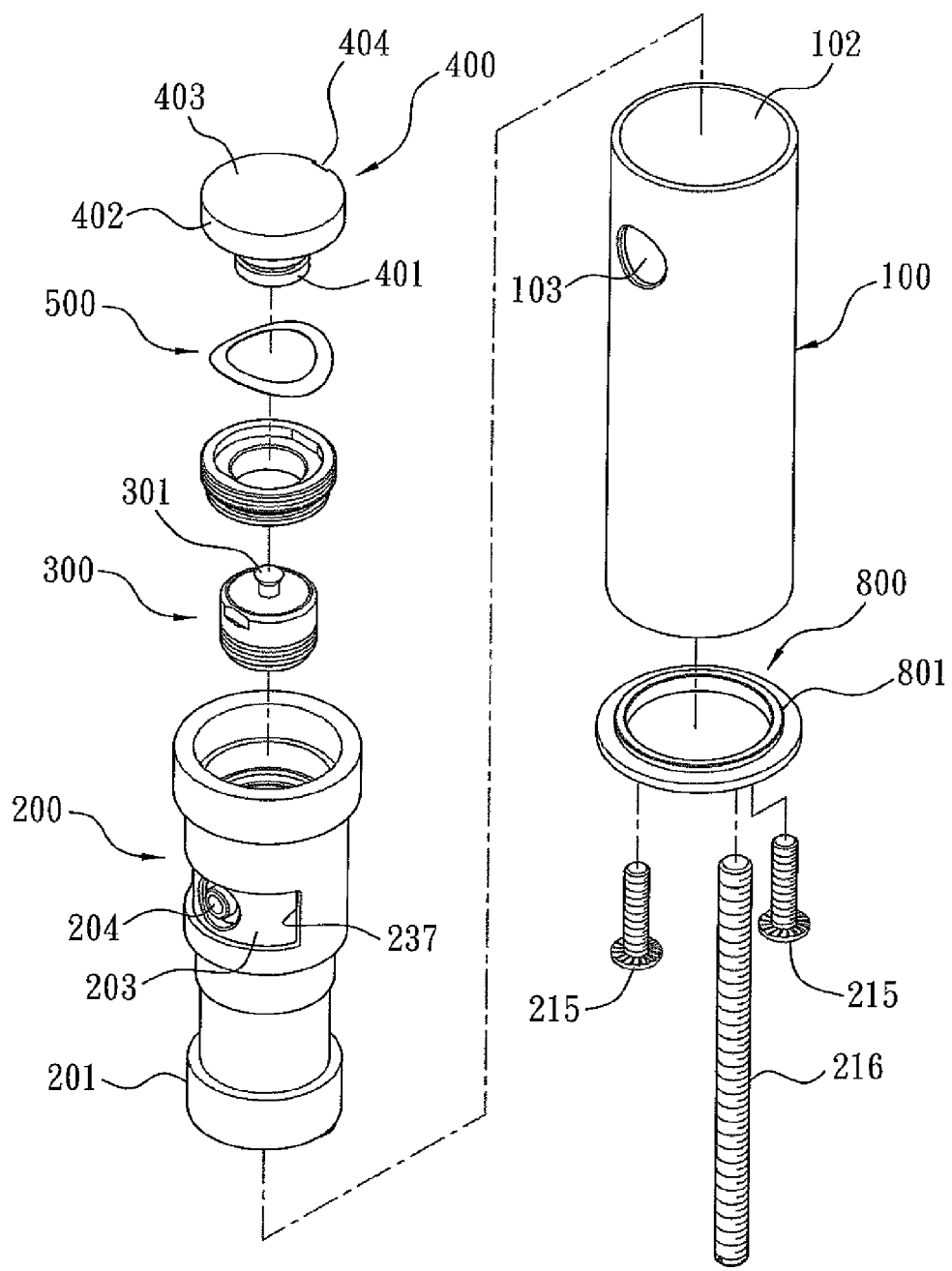
FIG. 13 is a partially exploded view of the second embodiment of the invention.

As shown in FIGS. 12-13, the shell body 100 has an installation chamber 101 whose top is formed with an embedding opening 102.

The temperature-control valve 200 is embedded in the installation chamber 101 through the embedding opening 102. The temperature-control valve 200 has an inlet portion 201 for receiving hot water and cold water, a mixing chamber 202 for mixing the hot and cold water in a predetermined ration and an outlet portion 203 for outputting mixed water.

The water-saving valve 300 connects the outlet portion 203 of the temperature-control valve 200 and is provided with an operating bar 301 for controlling the water-saving valve 300 to allow water from the mixing chamber 202 to flow through the water-saving valve 30 and to flow out from the outlet portion 203.

The pressing button 400 has an activating portion 401 which is embedded into the outlet portion 203. The activating portion 401 can be linearly moved along an axis X of the outlet portion 203 to press the operating bar 301 of the water-saving valve 300.

This embodiment of the invention further includes a restorer 500 for restoring the pressing button 400 after it has been pressed. In detail, the restorer 500 is an elastic element disposed between a wall of the outlet portion 203 and the pressing button 400. Preferably, the elastic element is a compression spring as shown in FIG. 13.

The restorer 500 is not limited to the elastic element, there still are other available solutions. For example, two magnetic elements are separately disposed at two corresponding positions of the pressing button 400 and a wall of the outlet portion 203 thus the two magnetic elements will generate magnetic repulsion when the pressing button 400 is pressed.

As shown in FIG. 12, the embodiment of the touch-control faucet 2 further includes an outer outlet element 600 which penetrates the shell body 100 to connect the outlet portion 203 for draining the mixed water from the outlet portion 203. In detail, the outer outlet element 600 includes a tube body 610 connecting the shell body 100, a tube seat 620 fixed in the shell body 610, an inner tube 630 connecting between the tube seat 620 and the outlet portion 203, and a bubbling device 640 disposed on the tube seat 620. Thereby, the mixed water from the outlet portion 203 flows through the inner tube 630, tube seat 620 and bubbling device 640 to drain out.

As shown in FIGS. 12-13, in this embodiment, an inner wall of the installation chamber 101 if formed with a passing aperture 103. The outlet portion 203 is formed with an inner outlet aperture 204 corresponding to the passing aperture 103 so that the inner tube 630 of the outer outlet element 600 can connect and communicate with the inner outlet aperture 204 through the passing aperture 103.

Figure 14:
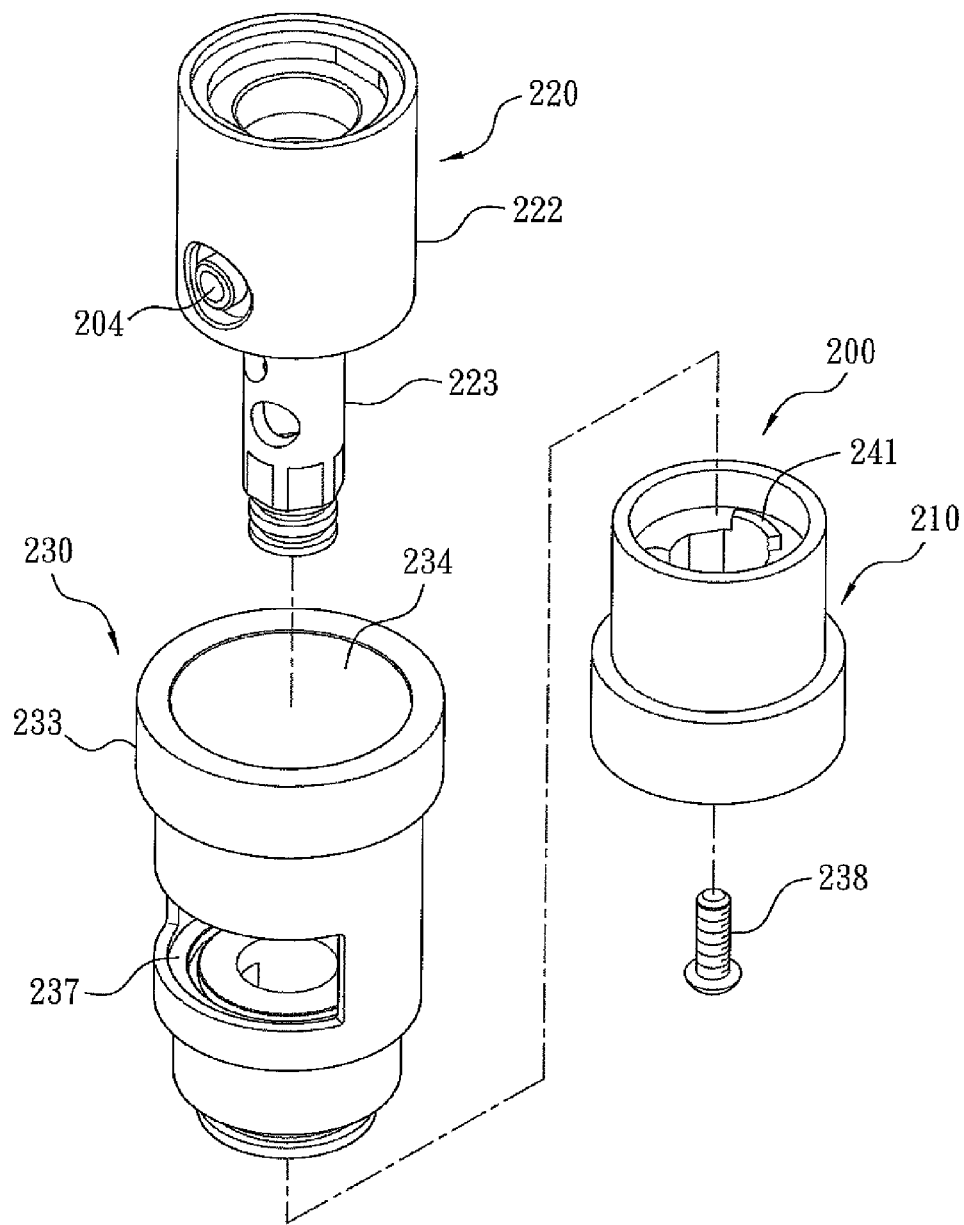
FIG. 14 is an exploded view of the temperature-control valve of the second embodiment of the invention.

As shown in FIG. 14, the temperature-control valve 200 of the embodiment further includes an inlet valve seat 210, a mixing valve core 220 and a temperature adjustment valve sleeve 230.

Figure 15:
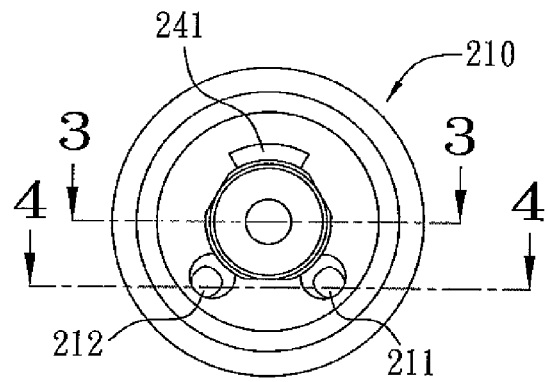
FIG. 15 is a top plan view of the inlet valve seat of the second embodiment of the invention.
Figure 16:
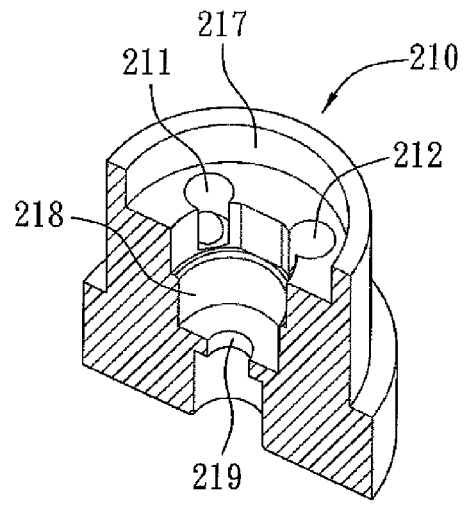
FIG. 16 is a cross-sectional view along line 3-3 in FIG. 15.
Figure 17:
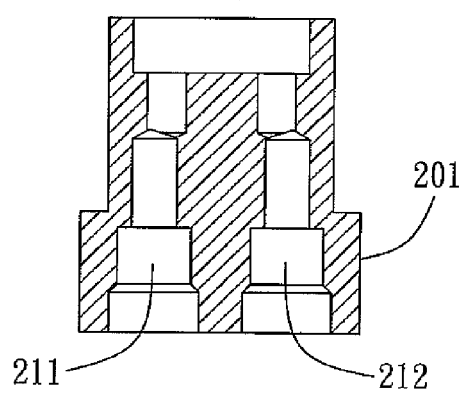
FIG. 17 is a cross-sectional view along line 4-4 in FIG. 15.

The inlet valve seat 210, as shown in FIGS. 15-17, is arranged in the installation chamber 101 and is provided with a cold water inlet channel 211 for receiving cold water and a hot water inlet channel 212 for receiving hot water, which form the inlet portion 201.

Figure 18:
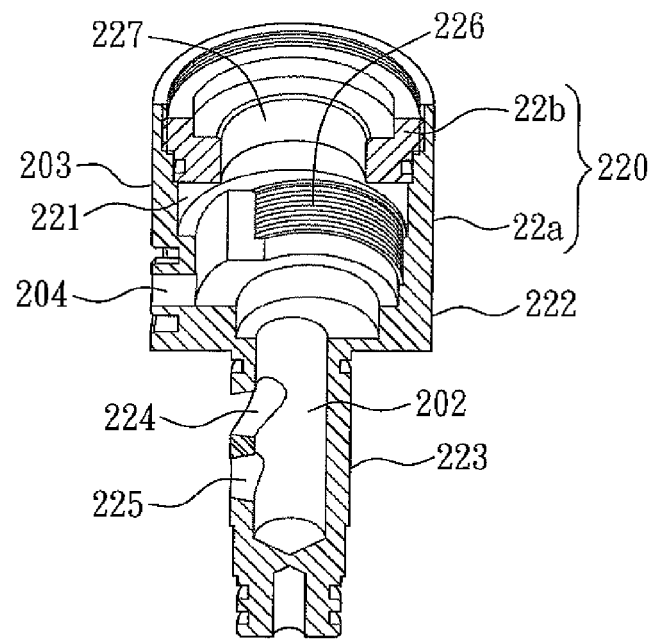
FIG. 18 is a cross-sectional view of the mixing valve core of the second embodiment of the invention.
Figure 19:
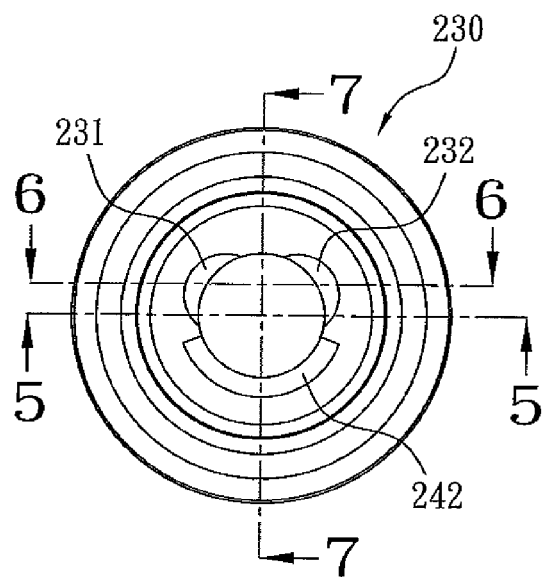
FIG. 19 is a bottom plan view of the temperature adjustment valve sleeve of the second embodiment of the invention.

The bottom of the mixing valve core 220, as shown in FIG. 18, is connected with the inlet valve seat 210. The mixing chamber 202 and a mixed water outlet channel 221 are defined in the mixing valve core 220. The mixed water outlet channel 221 communicates with the mixing chamber 202 and located in the outlet portion 203.

Figure 24:
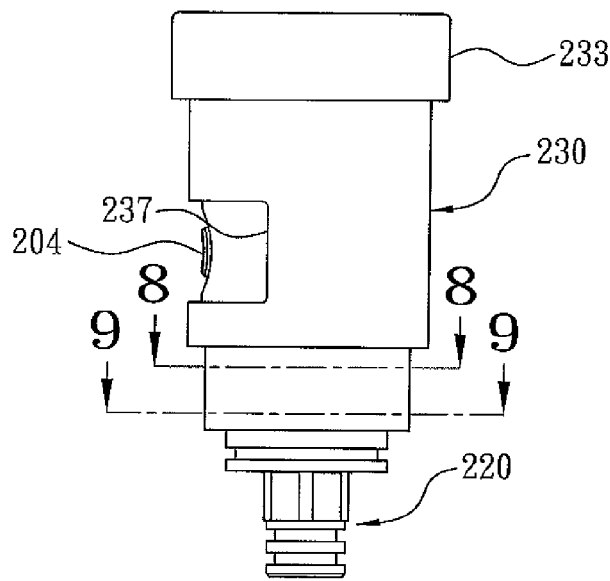
FIG. 24 is a side view of combination of the mixing valve core and temperature adjustment valve sleeve of the second embodiment of the invention.
Figure 25:
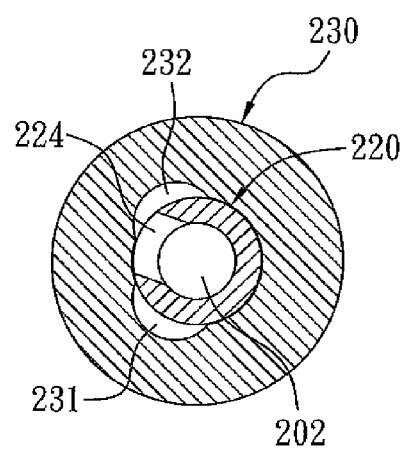
FIG. 25 is a cross-sectional view along line 8-8 in FIG. 24.
Figure 26:
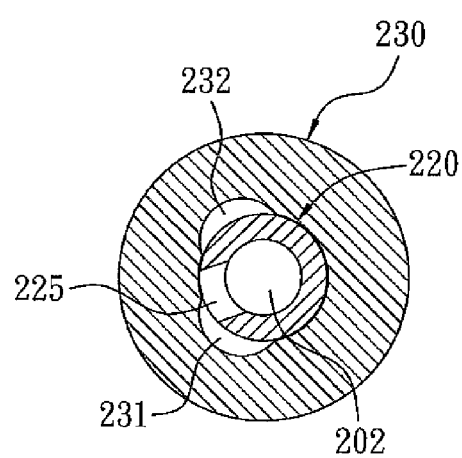
FIG. 26 is a cross-sectional view along line 9-9 in FIG. 24.
Figure 27:
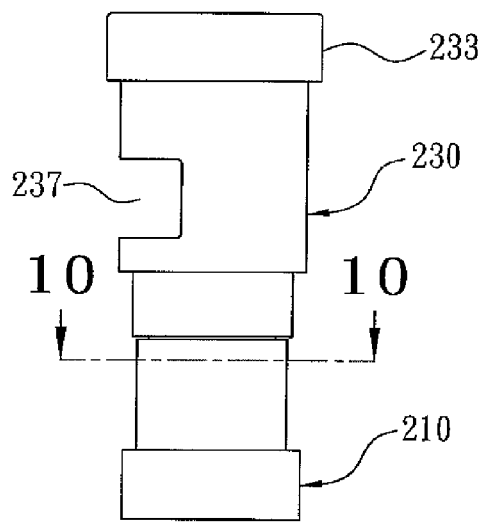
FIG. 27 is a side view of combination of inlet valve seat and temperature adjustment valve sleeve of the second embodiment of the invention.

The temperature adjustment valve sleeve 230, as shown in FIGS. 19-23, limitedly rotatably sheathes the mixing valve core 220 and is axially restrained between the mixing valve core 220 and the inlet valve seat 210. The temperature adjustment valve sleeve 230 and the mixing valve core 220 conjointly define a cold water channel 231 and a hot water channel 232 as shown in FIGS. 24-26. When the temperature adjustment valve sleeve 230 is rotated, the communicating volume of the cold water channel 231 and the cold water inlet channel 211 and the communicating volume of the hot water channel 232 and the hot water inlet channel 212 can be synchronously adjusted as shown in FIGS. 27-28, so that the mixing ratio of hot and cold water in the mixing chamber 202 can be controlled.

Figure 28:
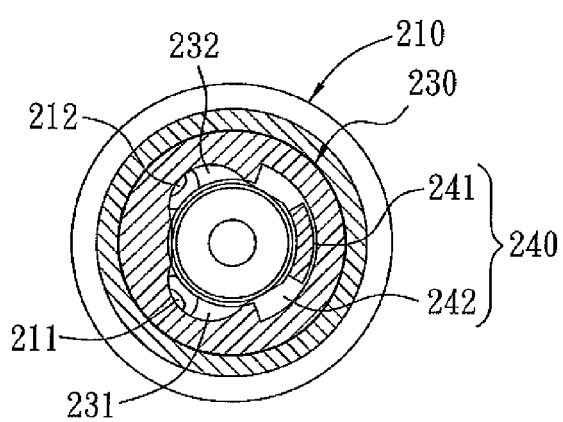
FIG. 28 is a cross-sectional view along line 10-10 in FIG. 27.
Figure 29:
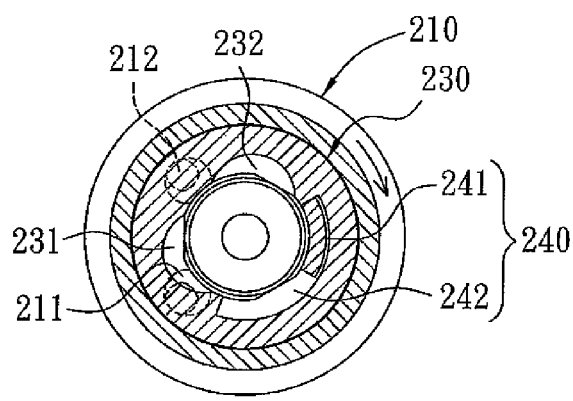
FIG. 29 is a schematic view of the temperature adjustment valve sleeve in FIG. 28 when it is clockwise rotated to a dead point.
Figure 30:
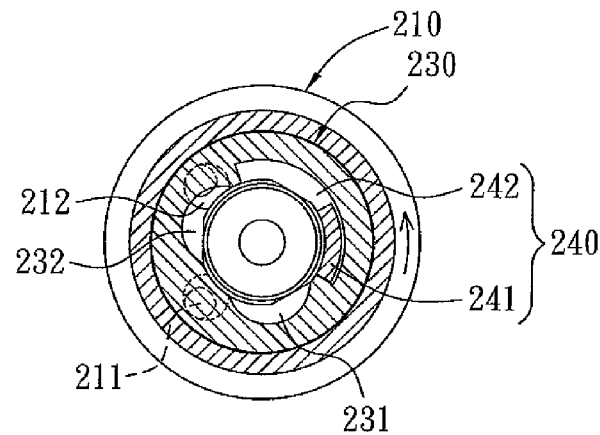
FIG. 30 is a schematic view of the temperature adjustment valve sleeve in FIG. 28 when it is counterclockwise rotated to a dead point.

As shown in FIGS. 14, 15 and 28, to make the temperature adjustment valve sleeve 230 restrained in a predetermined angular range to relatively rotate against the inlet valve seat 210, a rotation restraint structure 240 can be added between the inlet valve seat 210 and the temperature adjustment valve sleeve 230. In this embodiment, the rotation restraint structure 240 includes a positioning block 241 formed atop the inlet valve seat 210 and an arc-shaped restraining trough 242 formed in the bottom of the temperature adjustment valve sleeve 230 for slidably receiving the positioning block 241. As shown in FIG. 28, when the positioning block 241 is approximately located middle of the restraining trough 242, i.e., when the temperature adjustment valve sleeve 230 is rotated to a middle position, the cold water channel 231 can communicate with the cold water inlet channel 211 and hot water channel 232 can communicate with the hot water inlet channel 212. Under this condition, the mixing ratio and communicating volume are approximately identical. As shown in FIG. 29, when the temperature adjustment valve sleeve 230 is clockwise rotated about 40 degrees to the dead point, the hot water inlet channel 212 sealingly blocks the bottom of the temperature adjustment valve sleeve 230, so that the hot water inlet channel 212 cannot communicate with the hot water channel 232 and only the cold water inlet channel 211 communicates with the cold water channel 231. That is, only cold water can flow to the mixing chamber 202. Contrarily, as shown in FIG. 30, when the temperature adjustment valve sleeve 230 is counterclockwise rotated about 40 degrees to the dead point, the cold water inlet channel 211 sealingly blocks the bottom of the temperature adjustment valve sleeve 230, so that the cold water inlet channel 211 cannot communicate with the cold water channel 231 and only the hot water inlet channel 212 communicates with the hot water channel 232 only. That is, only hot water can flow to the mixing chamber 202.

As shown in FIGS. 14 and 18, in this embodiment, the mixing valve core 220 has a cylinder portion 222 and a tube portion 223 extending therefrom. The cylinder portion 222 may be used to form the outlet portion 203 and the mixed water outlet channel 221. And the inner outlet aperture 204 is formed in the cylinder portion 222. The tube portion 223 defines the mixing chamber 202. The bottom of the tube portion 223 connects to the inlet valve seat 210.

Figure 20:
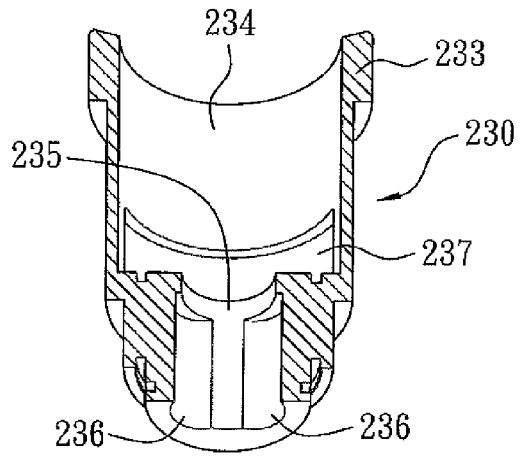
FIG. 20 is a cross-sectional view along line 5-5 in FIG. 19.
Figure 21:
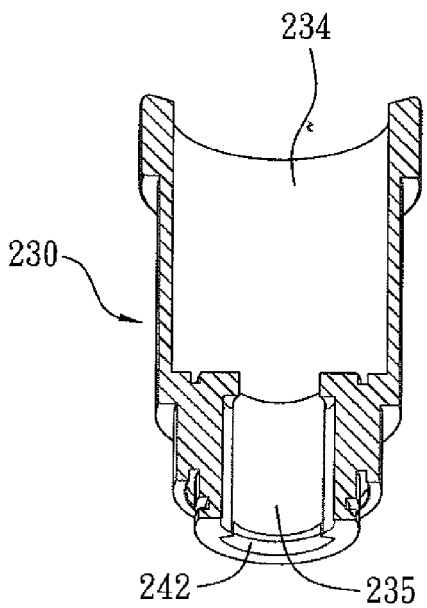
FIG. 21 is a cross-sectional view along line 6-6 in FIG. 19.
Figure 22:
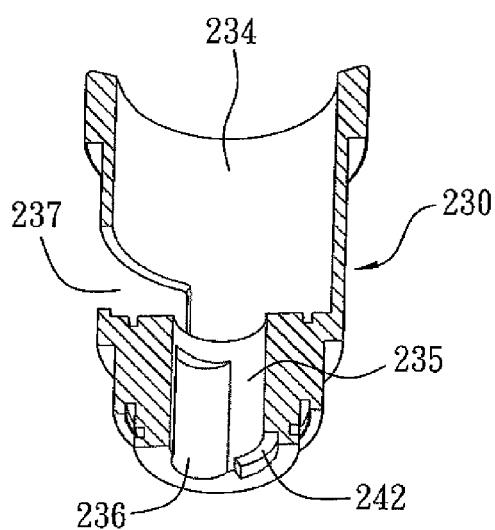
FIG. 22 is a cross-sectional view along line 7-7 in FIG. 19.

As shown in FIGS. 10, 14 and 20, in this embodiment, a rotating ring 233 is formed atop the temperature adjustment valve sleeve 230, and the rotating ring 233 projects from the embedding opening 102 for being held by a user. A receiving chamber 234 is formed in the rotating ring 233 for receiving the cylinder portion 222 and the pressing button 223. The bottom of the receiving chamber 234 is formed with a connecting hole 235 for being passed by the tube portion 223. The cold water channel 231 and the hot water channel 232 are defined by two axial channels 236 of an inner wall of the connecting hole 235 and an outer wall of the tube portion 223. The inner wall of the receiving chamber 230 of the temperature adjustment valve sleeve 230 is formed with a through hole 237 corresponding to the inner outlet aperture 204 of the mixing valve core 220 so that the inner tube 630 can pass through the through hole 237 to connect with the inner outlet aperture 204.

As shown in FIGS. 18, 25 and 26, in this embodiment, the tube portion of the mixing valve core 220 is radially formed with a first water hole 224 and a second water hole 225, which separately communicate with the mixing chamber 202. The first and second water holes 224 and 225 interlace with each other axially and radially. Thus, when a user rotates the temperature adjustment valve sleeve 230 to the angle as shown in FIG. 28, the first water hole 224 communicates with the cold water channel 231 as shown in FIG. 26, so that the cold water and hot water from the cold water inlet channel 211 and the hot water inlet channel 212 flow into the mixing chamber 202 in an approximate ratio to mix into mixed water.

Figure 31:
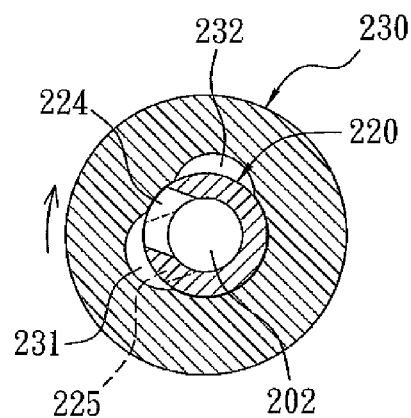
FIG. 31 is a schematic view of the temperature adjustment valve sleeve in FIG. 25 when it is clockwise rotated to a dead point and shows a virtual position of the second water hole in FIG. 26.

As shown in FIG. 31, when a user rotates the temperature adjustment valve sleeve 230 to the angle as shown in FIG. 29, the first water hole 224 and the second water hole 225 only communicate with the cold water channel 231 but do not communicate with the hot water channel 232, so that the cold water from the cold water inlet channel 211 flows into the mixing chamber 202 through the cold water channel 231 to drain cold water. As abovementioned, under this condition, the hot water channel 232 is blocked with the hot water inlet channel 212.

Figure 32:
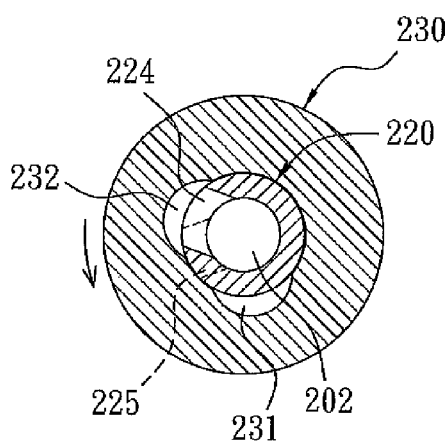
FIG. 32 is a schematic view of the temperature adjustment valve sleeve in FIG. 25 when it is counterclockwise rotated to a dead point and shows a virtual position of the second water hole in FIG. 26.

Furthermore, as shown in FIG. 32, when a user rotates the temperature adjustment valve sleeve 230 to the angle as shown in FIG. 30, the first water hole 224 and the second water hole 225 only communicate with the hot water channel 232 but do not communicate with the cold water channel 231, so that the hot water from the hot water inlet channel 212 flows into the mixing chamber 202 through the hot water channel 232 to drain hot water. As abovementioned, under this condition, the cold water channel 231 is blocked with the cold water inlet channel 211.

Figure 23:
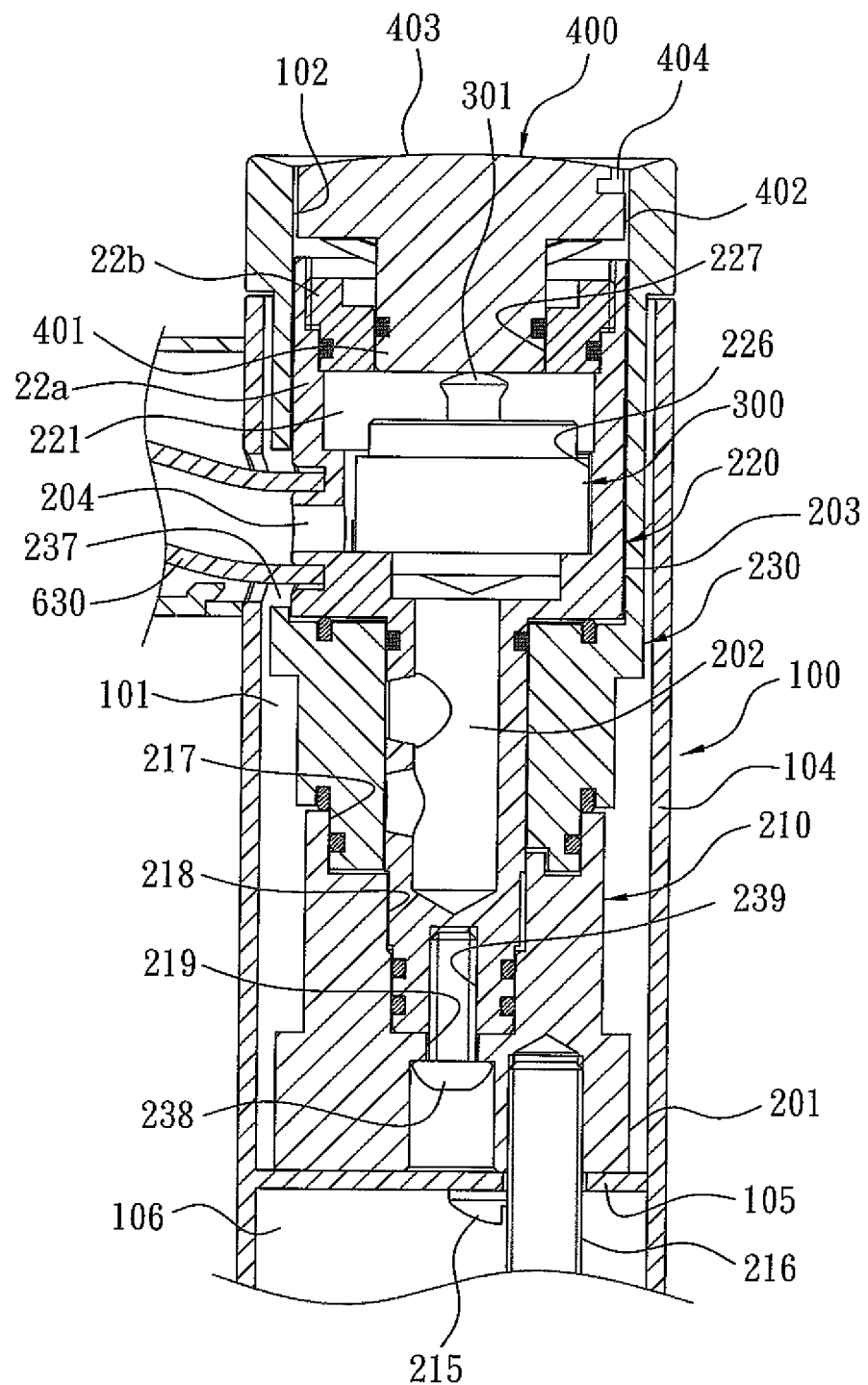
FIG. 23 is a partially enlarged view of FIG. 10.
Figure 33:
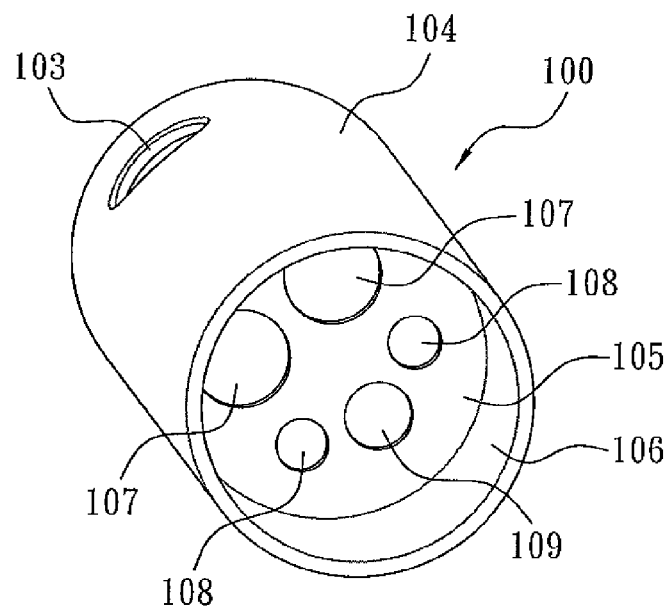
FIG. 33 is a bottom view of the shell body of the second embodiment of the invention.

As shown in FIGS. 23 and 33, in this embodiment, the shell body 100 is of a substantially cylindrical shape with a peripheral wall 104 and a support wall 105 therein. The support wall 105 divides the inner space of the peripheral wall 104 into the installation chamber 101 and a lower chamber 106. The support wall 105 is provided with two pipeline holes 107, two screw holes 108 and a bolt hole 109. The pipeline holes 107 are used to be passed through by a cold water pipeline and a hot water pipeline to separately connect the cold water inlet channel 211 and the hot water inlet channel 212 as shown in FIG. 34.

Figure 34:
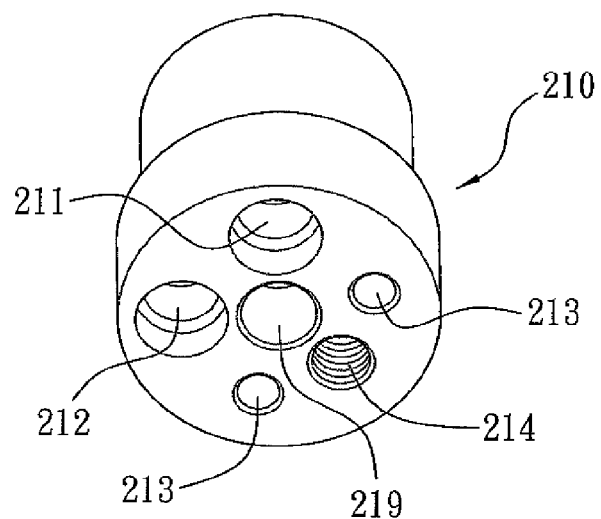
FIG. 34 is a bottom view of the inlet valve seat of the second embodiment of the invention.
Figure 35:
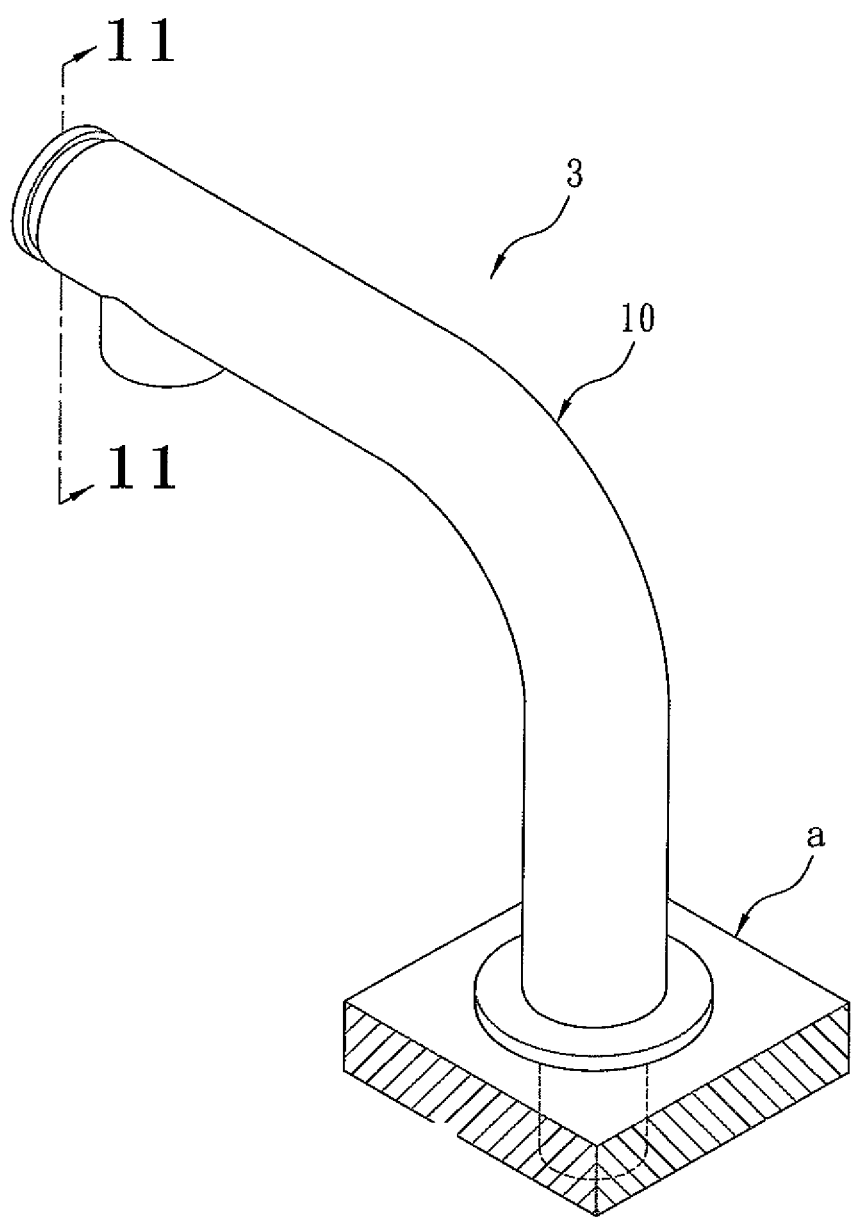
FIG. 35 is a schematic view of the third embodiment of the invention installed on a wall.
Figure 36:
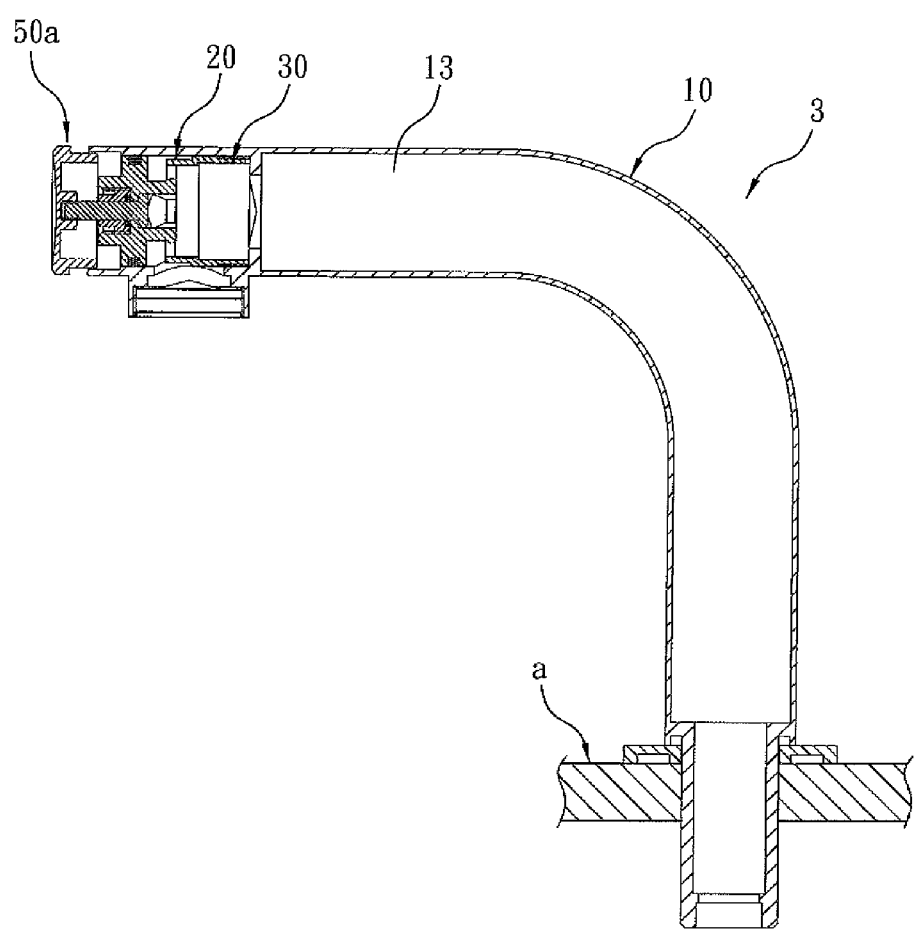
FIG. 36 is a cross-sectional view along line 11-11 in FIG. 35.
Figure 37:
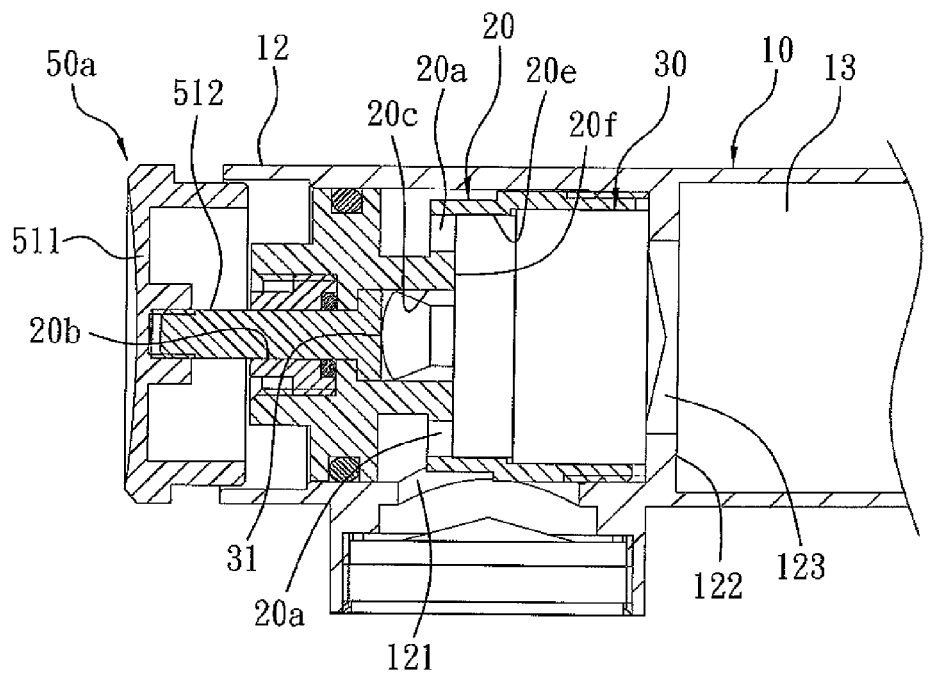
FIG. 37 is a partially enlarged view of FIG. 36.
Figure 38:
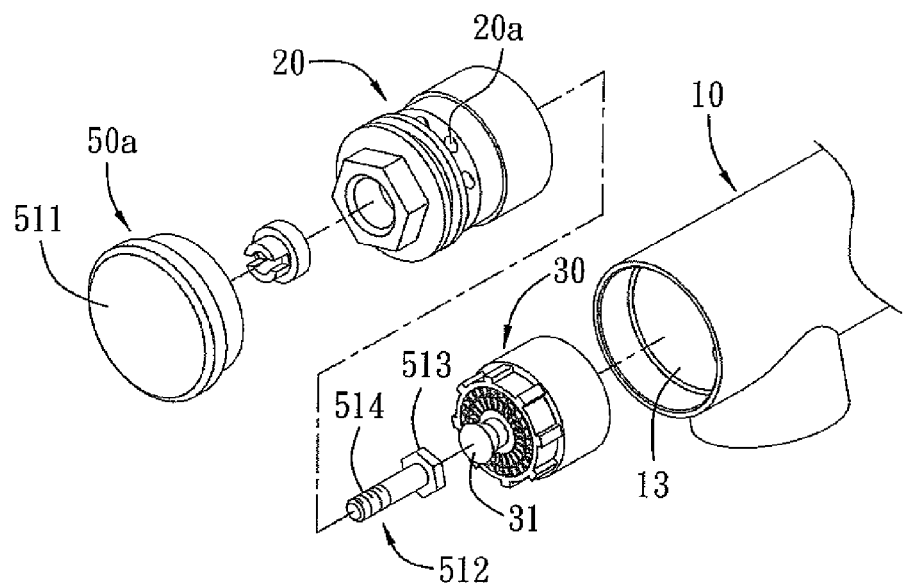
FIG. 38 is a partially exploded view of the third embodiment of the invention.
Figure 39:
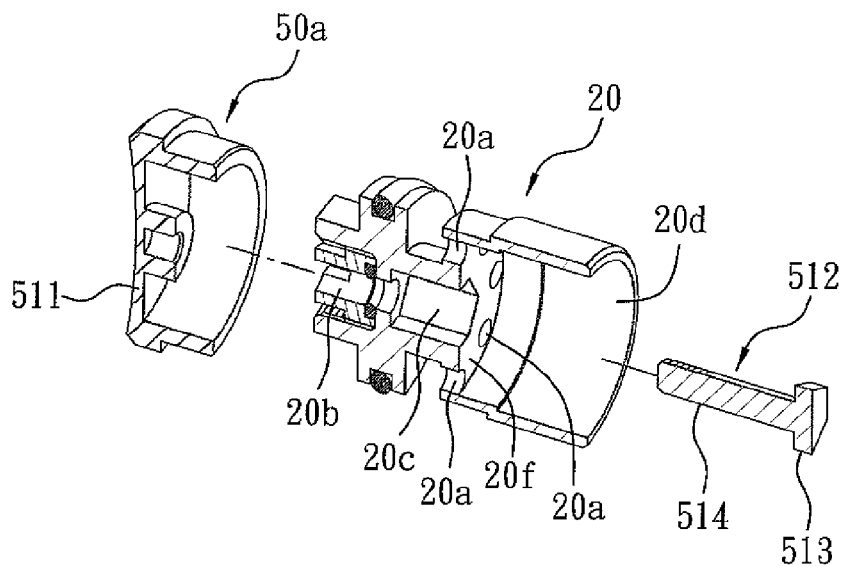
FIG. 39 is a partially exploded cross-sectional view of the third embodiment of the invention.

As shown in FIGS. 23 and 34, in this embodiment, the bottom of the inlet valve seat 210 is provided with two first threaded holes 213 and a second threaded hole 214. Two screws 215 separately pass through the screw holes 108 to screw to the first threaded holes 213 for fastening the inlet valve seat 210 to the shell body 100. Additionally, a bolt 216 passes through the bolt hole 109 to screw to the second threaded hole 214, and a screwing element 700 is screwed to the bolt 216 which has penetrated through the wall d for fastening the inlet valve seat 210 with the shell body 100 to the wall d as shown in FIG. 10.

As shown in FIGS. 10, 12 and 13, in this embodiment, the faucet 2 further includes a base ring 800 for abutting against the wall d. A positioning flange 801 is formed atop the base ring 800 for being passed by the lower chamber 106 of the shell body 100. The wall d may be a kitchen counter.

As shown in FIGS. 16 and 23, in this embodiment, the top of the inlet valve seat 210 is formed with a first connecting chamber 217 for rotatably receiving the bottom of the temperature adjustment valve sleeve 230. The bottom of the first connecting chamber 217 is formed with a second connecting chamber 218 for receiving the bottom of the mixing valve core 220. Additionally, the bottom of the inlet valve seat 210 is provided with a central hole 219 connecting the second connecting chamber 218. A screw 238 passes through the central hole 219 to screw to a threaded hole 239 on the bottom of the mixing valve core 220 for fastening the mixing valve core 220 to the inlet valve seat 210.

As shown in FIGS. 18 and 23, in this embodiment, the mixed water outlet channel 221 of the mixing valve core 220 is formed with a screwing portion 226 for screwing the water-saving valve 300. Additionally, the mixing valve core 220 has a body component 22a for forming a primary portion of the mixing valve core 220 and a cap component 22b screwed to the top of the body component 22a for forming a top wall of the mixed water outlet channel 221.

The canter of the cap component 22b is formed with a shaft hole 227 for slidably receiving the activating portion 401 of the pressing button 400.

As shown in FIGS. 13 and 23, in this embodiment, the pressing button 400 has a cap portion 402 and the activating portion 401 extending therefrom. The top of the cap portion 402 is formed with a pressing surface 403 for being pressed. Preferably, the pressing surface 403 is flush with the shell body 100 when it is not pressed for preventing from inadvertently touching and obtaining better appearance. To guarantee the pressing button 400 to be easily removed for cleaning or repair, the periphery of the cap portion 402 may be formed with a notch 404 for using a tool to open the pressing button 400 as shown in FIG. 9.

It is noted that, the water-saving valve 30 of the embodiment also may adopt commercially available products as the first embodiment.

The faucet 1, 2 of the invention uses the touch-control water-saving valve 30, 300 to allow users to easily operate the operating bar 31, 301 of the water-saving valve 30, 300 by pressing the pressing cap 50 of the first embodiment or the pressing button 400 of the second embodiment for opening or closing water. Also, the water-saving valve 30, 300 itself has its original function of water saving.

The faucet 1, 2 of the invention can open or close water only by touching the pressing cap 50 or the pressing button 400, so it is more convenient than the conventional core shaft.

The faucet 1, 2 of the invention makes users indirectly operating the water-saving valve 30, 300 by touching the pressing cap 50 or the pressing button 400, so it can prevent the water-saving valve 30, 300 from being contaminated by users' fingers. It meets related requirements of some countries' laws.

The faucet 1, 2 of the invention can change directions and types of water flow by guiding the water passing through the water-saving valve 30, 300 to the water guide 70 of the first embodiment or the outer outlet element 600 of the second embodiment. In comparison with conventional water-saving valves, such a design can obtain different directions and types of water flow for satisfying different requirements of users.

The faucet 2 of the second embodiment of the invention has functions of opening/closing water, water saving and temperature adjustment. Particularly, the two functions of opening/closing water and temperature adjustment are independent. In other words, a user can adjust temperature by rotating the rotating ring 233 or open/close water by touching the pressing button 400. This can enhance gorgeousness and quality of appearance of the faucet.

As shown in FIGS. 35-39, in this embodiment, the invention provides the third embodiment of the touch-control faucet, which is roughly identical to the first embodiment.

In this embodiment, the main body 10 is substantially L-shaped. The peripheral wall of the outlet end 12 is provided with an outlet opening 121 for replacing the outlet opening 54 of the pressing cap 50 in the first embodiment. The outlet opening 121 communicates with the water channel 13.

The positioning sleeve 20 of the embodiment is connected in the outlet end 12 of the main body 10 and has a passing hole 20b and at least one water hole 20a communicating with the water channel 13 and the outlet opening 121.

In this embodiment, the water-saving valve 30 is disposed between the outlet end 12 and the positioning sleeve 20. When its operating bar 31 is pressed, the water-saving valve 30 is opened to allow the water in the water channel 13 to flow toward the outlet opening 20a.

The faucet 3 of this embodiment includes an activator. In this embodiment, the activator is a pressing cap 50a disposed on the outlet end 12. The pressing cap 50a is slidable in the passing hole 20b of the positioning sleeve 20. The pressing cap 50a moves the operating bar of the water-saving valve 30 when the pressing cap 50a is pressed.

As the first embodiment, the faucet 3 may further include a restorer (not shown) for restoring the pressing cap 50a after it has been pressed. The restorer may be an elastic element disposed between the positioning sleeve 20 and the pressing cap 50a.

In this embodiment, the pressing cap 50a is provided with an end wall 511 and an activating rod 512 extending from the end wall 511. The activating rod 512 can slide in the passing hole 20b to press the operating bar 31 of the water-saving valve 30.

In this embodiment, the elastic element is a compression spring which is penetrated through by the activating rod 512. Two ends of the compression spring are separately stopped by the end wall 511 of the pressing cap 50a and the positioning sleeve 20. When the pressing cap 50a is being pressed, the compression spring is shrunk to generate elasticity.

In this embodiment, the restorer may be omitted. An alternative solution is to use the elasticity of the operating bar 31 to push the activating rod 512 to restore.

Furthermore, the activating rod 512 has a pushing portion 513 restricted in the positioning sleeve 20 and a rod portion 514 connecting with the pushing portion 513 and penetrating through the passing hole 20b to connect with the end wall 511. The pushing portion 513 can press the operating bar 31 of the water-saving valve 30.

In this embodiment, a rod hole 20c is defined in the positioning sleeve 20 to communicate with the passing hole 20b. The pushing portion 513 can limitedly slide in the rod hole 20c. For example, the rod hole 20c and the pushing portion 513 may be shaped into corresponding polygonal hole and rod, respectively, to accomplish the effect of limited rotation.

In this embodiment, the inner wall of the outlet end 12 is provided with a positioning ring 122 with a through hole 123 for forming a part of the water channel 13. The positioning sleeve 20 defines a receiving room therein. The receiving room 20d and the positioning ring 122 conjointly define an installation chamber 20e for receiving the water-saving valve 30. The bottom 20f of the receiving room 20d is pushed and supported by the operating bar 31 for preventing the operating bar 31 from being deformed because of the water pressure. The rod hole 20c is located at the center of the bottom 20f of the receiving room 20d, and a plurality of water holes 20a are disposed around the rod hole 20f.

Figure 40:
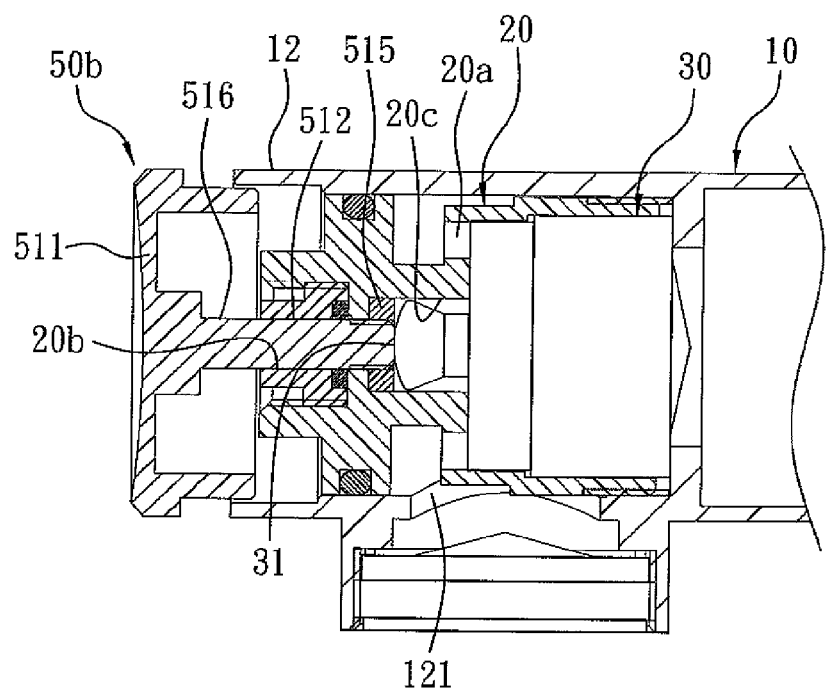
FIG. 40 is a partially cross-sectional view of the fourth embodiment of the invention.
Figure 41:
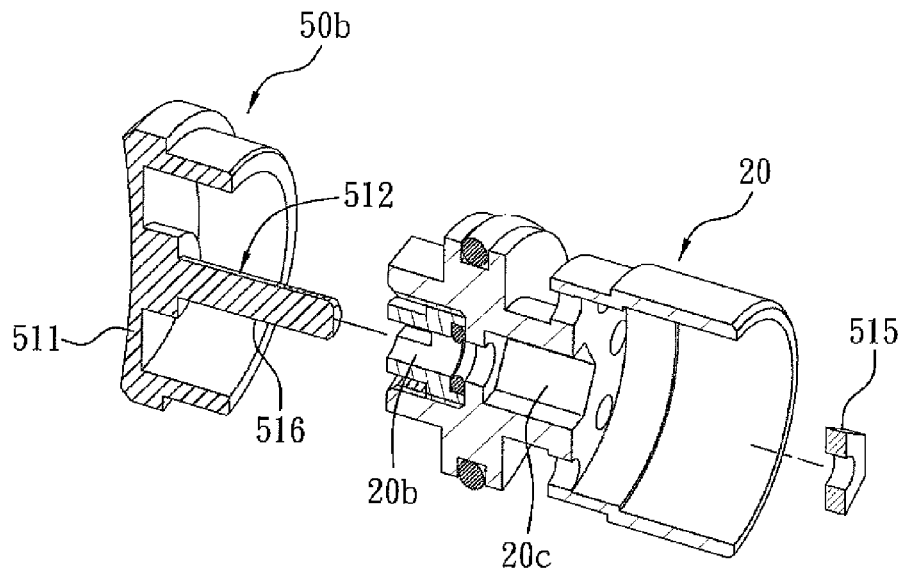
FIG. 41 is a partially exploded cross-sectional view of the fourth embodiment of the invention.

As shown in FIGS. 40-41, the invention further provides the fourth embodiment of a faucet. The fourth embodiment is approximately identical to the third embodiment. In the fourth embodiment, the activating rod 512 of the pressing cap 50b has a restraining block 515 restrained in the positioning sleeve 20 and a rod portion 516, whose two ends separately connect the end wall 511 and the restraining block 515 through the passing hole 20b. Either of the restraining block 515 and the rod portion 516 can press the operating bar 31. In this embodiment, the rod portion 516 is used to activate the water-saving valve 30.

Additionally, in this embodiment, the restraining block 515 can slide in the rod hole 20c. For example, the rod hole 20c and the restraining block 515 may be shaped into corresponding polygonal hole and block, respectively, to accomplish the effect of limited rotation.

Figure 42:
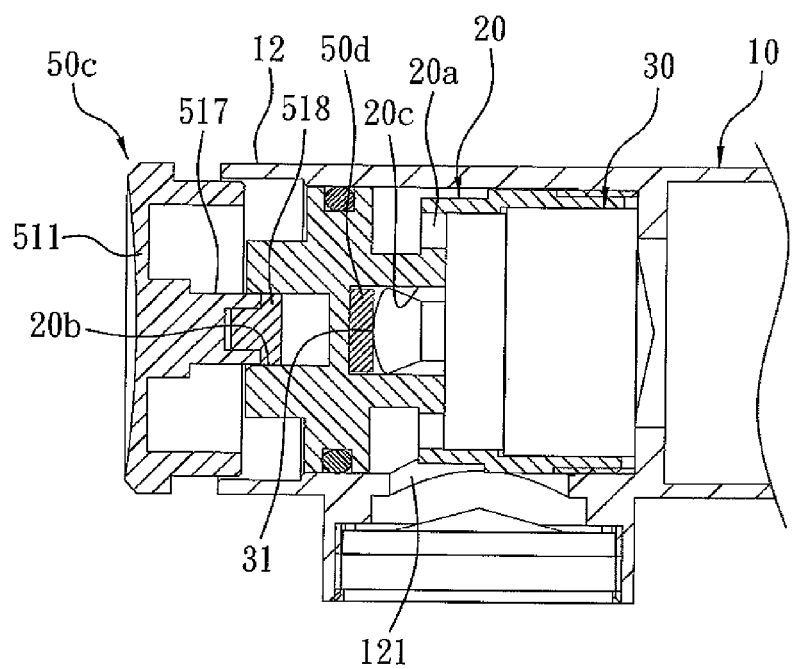
FIG. 42 is a partially cross-sectional view of the fifth embodiment of the invention.

As shown in FIG. 42, the invention further provides the fifth embodiment of a faucet. The fifth embodiment is approximately identical to the third and fourth embodiments. In the fifth embodiment, the pressing cap 50c has end wall 511 and an activating rod 517 extending therefrom. The activating rod 517 can slide in the passing hole 20b of the positioning sleeve 20, and an end of the activating rod 517 is provided with a first magnetic element 518.

In this embodiment, the rod hole 20c of the positioning sleeve 20 can receive the operating bar 31 of the water-saving valve 30 and is isolated with the passing hole 20b for preventing the water in the rod hole 20c from seeping through the passing hole 20b. This embodiment further includes a second magnetic element 50d in the rod hole 20c. When the pressing cap 50c is pressed, the first magnetic element 518 is moved to near the second magnetic element 50d to generate magnetic repulsion, so that the second magnetic element 50d moves to press the operating bar 31. When the pressure on the pressing cap is released, the second magnetic element 50d is pushed by the elasticity of the operating bar 31 to restore and the first magnetic element 518 is pushed to restore the pressing cap 50c.

The contact area between the activating rod 512, 517 of the pressing cap 50a, 50b, 50c of the third, fourth and fifth embodiments and the passing hole 20b of the positioning sleeve 20 is obviously smaller than that between the surrounding wall 52 of the pressing cap 50 and the peripheral wall of the positioning sleeve 20 of the first embodiment. Thus, the pressing operation is easier and the effect of water resistance is better.

What is claimed is:

1. A touch-control faucet comprising:
a main body, having an inlet end, an outlet end, a water channel between the inlet end and the outlet end, and an outlet opening communicating with the water channel, wherein the outlet opening is located on a wall of the outlet end, and a positioning ring with a through hole is provided in the outlet end to form a partition;
a positioning sleeve, axially fixed in the outlet end of the main body, having a water hole and a passing hole, wherein an end of the positioning sleeve is blocked by the positioning ring, at least a part of a cylindrical surface of the positioning sleeve abuts against the wall of the outlet end, and the water hole communicates with the water channel and the outlet opening;
a water-saving valve, being an independent module with a cylindrical shape, axially received in the positioning sleeve, abutting against the positioning sleeve and the positioning ring, and having an operating bar for controlling the water-saving valve to allow water in the water channel to flow toward the water hole; and
an activator, having a pressing cap disposed at the outlet end, wherein a part of the pressing cap is axially slidably disposed in the outlet end, and the pressing cap is slidable over the positioning sleeve and moves the operating bar when the pressing cap is pressed.

2. The touch-control faucet of claim 1, further comprising a restorer for restoring the pressing cap when pressure exerted on the pressing cap has been released.

3. The touch-control faucet of claim 2, wherein the restorer is an elastic element disposed between the positioning sleeve and the pressing cap.

4. The touch-control faucet of claim 3, wherein the pressing cap is provided with an end wall and an activating rod extending from the end wall, and the activating rod is slidable in the passing hole of the positioning sleeve for pressing the operating bar of the water-saving valve.

5. The touch-control faucet of claim 4, wherein the elastic element is a compression spring which is penetrated through by the activating rod, two ends of the compression spring are separately stopped by the end wall of the pressing cap and the positioning sleeve, and the compression spring is shrunk to generate elasticity when the pressing cap is pressed.

6. The touch-control faucet of claim 2, further comprising a first magnetic element and a second magnetic element, which are separately disposed at two corresponding positions of the pressing cap and the outlet end of the main body, wherein the two magnetic elements will generate magnetic repulsion when the pressing cap is pressed.

7. The touch-control faucet of claim 1, wherein the pressing cap has an end wall and an activating rod extending from the end wall, and the activating rod is slidable in the passing hole of the positioning sleeve for pressing the operating bar of the water-saving valve.

8. The touch-control faucet of claim 7, wherein the activating rod has a pushing portion restricted in the positioning sleeve for pressing the operating bar of the water-saving valve and a rod portion, an end of the rod portion connects the pushing portion, and another end thereof penetrates through the passing hole to connect the end wall.

9. The touch-control faucet of claim 8, wherein a rod hole is formed in the positioning sleeve for communicating with the passing hole, and the pushing portion is movable in the rod hole.

10. The touch-control faucet of claim 7, wherein the activating rod has a restraining block restrained in the positioning sleeve and a rod portion, two ends of the rod portion separately connect the end wall and the restraining block through the passing hole, and either of the restraining block and the rod portion is capable of pressing the operating bar of the water-saving valve.

11. The touch-control faucet of claim 10, wherein a rod hole is formed in the positioning sleeve for communicating with the passing hole, and the restraining block is movable in the rod hole.

12. The touch-control faucet of claim 1, wherein the positioning sleeve defines a receiving room therein, the receiving room and the positioning ring conjointly define an installation chamber for receiving the water-saving valve, and a rod hole is formed at a center of the bottom of the receiving room, and at least one water hole is disposed beside the rod hole.

13. The touch-control faucet of claim 1, wherein the pressing cap is provided with an end wall and an activating rod extending from the end wall, the activating rod is slidable in the passing hole, an end of the activating rod is provided with a first magnetic element, the activator includes a second magnetic element in the rod hole, when the pressing cap is pressed, the first magnetic element is moved toward the second magnetic element to generate magnetic repulsion, so that the second magnetic element moves to press the operating bar.

14. The touch-control faucet of claim 13, wherein the positioning sleeve defines a receiving room therein, the receiving room and the positioning ring conjointly define an installation chamber for receiving the water-saving valve, and a rod hole is formed at a center of the bottom of the receiving room, and at least one water hole is disposed beside the rod hole.

15. The touch-control faucet of claim 1, wherein an outside of an end wall of the pressing cap is formed with a pressing surface.

16. The touch-control faucet of claim 1, wherein the water-saving valve is closed by pressing when it has been opened.

17. The touch-control faucet of claim 1, wherein the water-saving valve will automatically close after it has been opened for a period of time.

\* \* \* \* \*